US012775435B2

(12) United States Patent
Wilczynski et al.

(10) Patent No.: US 12,775,435 B2
(45) Date of Patent: Oct. 27, 2026

(54) DISPLAYING AN UPDATE TO A GEOGRAPHICAL AREA

(71) Applicant: Palantir Technologies Inc., Aventura, FL (US)

(72) Inventors: Peter Wilczynski, San Francisco, CA (US); Daniel Cervelli, Mountain View, CA (US); John Carrino, Redwood City, CA (US); Quentin Spencer-Harper, London (GB); Peter Hong, Kalamazoo, MI (US); Andrew Moreland, Stanford, CA (US); William Waldrep, Palo Alto, CA (US); Daniel Paquette, Ashburn, VA (US)

(73) Assignee: Palantir Technologies Inc., Aventura, FL (US)

( * ) Notice: Subject to any disclaimer, the term of this patent is extended or adjusted under 35 U.S.C. 154(b) by 48 days.

(21) Appl. No.: 15/348,860

(22) Filed: Nov. 10, 2016

(65) Prior Publication Data

US 2017/0329569 A1 Nov. 16, 2017

Related U.S. Application Data

(60) Provisional application No. 62/337,052, filed on May 16, 2016.

(51) Int. Cl.
*G06F 3/14* (2006.01)
*H04L 67/02* (2022.01)
(Continued)

(52) U.S. Cl.
CPC .......... *G06F 3/1462* (2013.01); *G06F 3/1454* (2013.01); *H04L 67/02* (2013.01);
(Continued)

(58) Field of Classification Search
CPC .... G06F 3/1454; G06F 3/1462; G06F 3/0482; H04L 67/01; H04L 67/02; H04L 67/104;
(Continued)

(56) References Cited

U.S. PATENT DOCUMENTS 4,899,161 A 2/1990 Morin, Jr. et al.
4,958,305 A 9/1990 Piazza
(Continued)

FOREIGN PATENT DOCUMENTS

AU 2012216622 A1 4/2013
AU 2012216622 5/2015
(Continued)

OTHER PUBLICATIONS

"A First Look: Predicting Market Demand for Food Retails using a Huff Analysis", TRF Policy Solutions, CDFI Fund, Capacity Building Initiative, (Jul. 2012), 1-30.
(Continued)

*Primary Examiner* — Cesar B Paula
*Assistant Examiner* — John M Heffington
(74) *Attorney, Agent, or Firm* — Faegre Drinker Biddle & Reath LLP

(57) ABSTRACT

In various example embodiments, a system and method for displaying an update to a geographical area are presented. An indication of an update to geographical area is received. The geographical area is displayed on one or more devices. Moreover, the geographical area includes an artifact that corresponds to geospatial data. The update to the geographical area is generated based on the received indication of the update. Data that causes display of the generated update to the geographical area is transmitted to each of the one or more devices.

13 Claims, 12 Drawing Sheets

(51) Int. Cl.
*H04L 67/104* (2022.01)
*G06F 3/0482* (2013.01)
*H04L 67/01* (2022.01)

(52) U.S. Cl.
CPC .......... *H04L 67/104* (2013.01); *G06F 3/0482* (2013.01); *G09G 2370/04* (2013.01); *G09G 2370/16* (2013.01); *G09G 2380/02* (2013.01); *G09G 2380/10* (2013.01); *H04L 67/01* (2022.05)

(58) Field of Classification Search
CPC ........... G09G 2370/04; G09G 2370/16; G09G 2380/02; G09G 2380/10
See application file for complete search history.

(56) References Cited

U.S. PATENT DOCUMENTS 5,329,108 A 7/1994 Lamoure
5,754,182 A 5/1998 Kobayashi
5,781,195 A 7/1998 Marvin
5,781,704 A 7/1998 Rossmo
6,091,956 A 7/2000 Hollenberg
6,157,747 A 12/2000 Szeliski et al.
6,169,552 B1 1/2001 Endo et al.
6,173,067 B1 1/2001 Payton et al.
6,178,432 B1 1/2001 Cook et al.
6,247,019 B1 6/2001 Davies
6,389,289 B1 5/2002 Voce
6,414,683 B1 7/2002 Gueziec
6,483,509 B1 11/2002 Rabenhorst
6,529,900 B1 3/2003 Patterson et al.
6,631,496 B1 10/2003 Li et al.
6,662,103 B1 12/2003 Skolnick et al.
6,757,445 B1 6/2004 Knopp
6,828,920 B2 12/2004 Owen et al.
6,983,203 B1 1/2006 Wako
6,985,950 B1 1/2006 Hanson et al.
7,036,085 B2 4/2006 Barros
7,158,878 B2 1/2007 Rasmussen
7,375,732 B2 5/2008 Arcas
7,379,811 B2 5/2008 Rasmussen et al.
7,457,706 B2 11/2008 Melero
7,502,786 B2 3/2009 Liu et al.
7,519,470 B2 4/2009 Brasche et al.
7,529,195 B2 5/2009 Gorman
7,539,666 B2 5/2009 Ashworth et al.
7,558,677 B2 7/2009 Jones
7,574,428 B2 8/2009 Leiserowitz et al.
7,579,965 B2 8/2009 Bucholz
7,617,314 B1 11/2009 Bansod
7,620,628 B2 11/2009 Kapur et al.
7,663,621 B1 2/2010 Allen
7,791,616 B2 9/2010 Loup et al.
7,805,457 B1 9/2010 Viola et al.
7,809,703 B2 10/2010 Balabhadrapatruni et al.
7,872,647 B2 1/2011 Mayer et al.
7,894,984 B2 2/2011 Rasmussen et al.
7,899,611 B2 3/2011 Downs et al.
7,920,963 B2 4/2011 Jouline et al.
7,945,852 B1 5/2011 Pilskains
7,962,281 B2 6/2011 Rasmussen et al.
7,970,240 B1 6/2011 Chao et al.
8,010,545 B2 8/2011 Stefik et al.
8,036,632 B1 10/2011 Cona et al.
8,065,080 B2 11/2011 Koch
8,085,268 B2 12/2011 Carrino et al.
8,134,457 B2 3/2012 Velipasalar et al.
8,145,703 B2 3/2012 Frishert et al.
8,200,676 B2 6/2012 Frank
8,214,361 B1 7/2012 Sandler et al.
8,214,764 B2 7/2012 Gemmell et al.
8,229,947 B2 7/2012 Fujinaga
8,230,333 B2 7/2012 Decherd et al.
8,275,508 B1 9/2012 Adams et al.
8,290,942 B2 10/2012 Jones et al.
8,290,943 B2 10/2012 Carbone et al.
8,301,464 B1 10/2012 Cave et al.
8,325,178 B1 12/2012 Doyle et al.
8,368,695 B2 2/2013 Howell et al.
8,397,171 B2 3/2013 Klassen et al.
8,400,448 B1 3/2013 Doyle
8,407,180 B1 3/2013 Ramesh et al.
8,412,234 B1 4/2013 Gatmir-Motahari et al.
8,412,707 B1 4/2013 Mianji
8,422,825 B1 4/2013 Neophytou et al.
8,452,790 B1 5/2013 Mianji
8,463,036 B1 6/2013 Ramesh et al.
8,489,331 B2 7/2013 Kopf et al.
8,489,641 B1 7/2013 Seefeld et al.
8,498,984 B1 7/2013 Hwang et al.
8,508,533 B2 8/2013 Cervelli et al.
8,514,229 B2 8/2013 Cervelli et al.
8,515,207 B2 8/2013 Chau
8,564,596 B2 10/2013 Carrino et al.
8,742,934 B1 6/2014 Sarpy, Sr. et al.
8,781,169 B2 7/2014 Jackson et al.
8,799,799 B1 8/2014 Cervelli et al.
8,830,322 B2 9/2014 Nerayoff et al.
8,938,686 B1 1/2015 Erenrich et al.
8,949,164 B1 2/2015 Mohler
8,983,494 B1 3/2015 Onnen et al.
9,009,177 B2 4/2015 Zheng et al.
9,021,384 B1 4/2015 Beard et al.
9,104,293 B1 8/2015 Kornfeld et al.
9,104,695 B1 8/2015 Cervelli et al.
9,111,380 B2 8/2015 Piemonte et al.
9,129,219 B1 9/2015 Robertson et al.
9,146,125 B2 9/2015 Vulcano et al.
9,280,618 B1 3/2016 Bruce et al.
9,805,582 B2 * 10/2017 Jedwab ............ G08B 13/19654
2002/0003539 A1 1/2002 Abe
2002/0033848 A1 3/2002 Sciammarella et al.
2002/0116120 A1 8/2002 Ruiz et al.
2002/0130867 A1 9/2002 Yang et al.
2002/0130906 A1 9/2002 Miyaki
2003/0052896 A1 3/2003 Higgins et al.
2003/0103049 A1 6/2003 Kindatenko et al.
2003/0144868 A1 7/2003 MacIntyre et al.
2003/0163352 A1 8/2003 Surpin et al.
2003/0225755 A1 12/2003 Iwayama et al.
2004/0030492 A1 2/2004 Fox et al.
2004/0039498 A1 2/2004 Ollis et al.
2004/0049345 A1 * 3/2004 McDonough .......... G06Q 10/10 702/12
2004/0098236 A1 5/2004 Mayer et al.
2004/0143602 A1 7/2004 Ruiz et al.
2005/0031197 A1 2/2005 Knopp
2005/0034062 A1 2/2005 Bufkin et al.
2005/0068169 A1 3/2005 Copley et al.
2005/0080769 A1 4/2005 Gemmell et al.
2005/0143602 A1 6/2005 Yada
2005/0162523 A1 7/2005 Darrell et al.
2005/0182502 A1 8/2005 Iyengar
2005/0182793 A1 8/2005 Keenan et al.
2005/0187588 A1 8/2005 Stahmann et al.
2005/0223044 A1 10/2005 Ashworth et al.
2005/0267652 A1 12/2005 Allstadt et al.
2006/0015254 A1 * 1/2006 Smith ..................... H04W 4/02 340/905
2006/0026170 A1 2/2006 Kreitler et al.
2006/0139375 A1 6/2006 Rasmussen et al.
2006/0146050 A1 7/2006 Yamauchi
2006/0149596 A1 7/2006 Surpin et al.
2006/0200384 A1 9/2006 Arutunian et al.
2006/0251307 A1 11/2006 Florin et al.
2006/0259527 A1 11/2006 Devarakonda et al.
2006/0268120 A1 * 11/2006 Funakura ........... H04N 1/00132 348/231.2
2006/0271277 A1 11/2006 Hu et al.
2006/0279630 A1 12/2006 Aggarwal et al.
2007/0011150 A1 1/2007 Frank
2007/0016363 A1 1/2007 Huang et al.
2007/0024620 A1 2/2007 Muller-Fischer et al.

(56) References Cited

U.S. PATENT DOCUMENTS

2007/0057966 A1 3/2007 Ohno et al.
2007/0078832 A1 4/2007 Ott et al.
2007/0115373 A1 5/2007 Gallagher et al.
2007/0179347 A1* 8/2007 Tarassenko ............ G16H 20/10 600/300
2007/0188516 A1 8/2007 Ioup et al.
2007/0204218 A1* 8/2007 Weber .................... G01C 21/20 715/234
2007/0208497 A1 9/2007 Downs et al.
2007/0208498 A1 9/2007 Barker et al.
2007/0233367 A1* 10/2007 Chen ...................... G01C 21/00 701/408
2007/0258642 A1 11/2007 Thota
2007/0268310 A1* 11/2007 Dolph ..................... G06T 17/05 345/629
2007/0277111 A1* 11/2007 Bennett ............... G06F 3/04812 715/763
2007/0288164 A1* 12/2007 Gordon .................. G01C 21/20 701/469
2007/0294643 A1 12/2007 Kyle
2007/0296574 A1* 12/2007 Smith .................... G08B 21/10 340/539.13
2008/0010605 A1 1/2008 Frank
2008/0040684 A1 2/2008 Crump et al.
2008/0077642 A1 3/2008 Carbone
2008/0082578 A1 4/2008 Houge et al.
2008/0098085 A1 4/2008 Krane et al.
2008/0104019 A1 5/2008 Nath
2008/0133579 A1 6/2008 Lim
2008/0155027 A1* 6/2008 Martin ................... G01C 21/00 709/206
2008/0163073 A1 7/2008 Becker et al.
2008/0192053 A1 8/2008 Howell
2008/0194268 A1 8/2008 Koch
2008/0195417 A1 8/2008 Surpin
2008/0223834 A1 9/2008 Griffiths et al.
2008/0229056 A1 9/2008 Agarwal et al.
2008/0263468 A1 10/2008 Cappione et al.
2008/0267107 A1 10/2008 Rosenberg
2008/0270468 A1 10/2008 Mao et al.
2008/0278311 A1 11/2008 Grange et al.
2008/0288306 A1 11/2008 MacIntyre et al.
2008/0294678 A1 11/2008 Gorman et al.
2008/0301643 A1 12/2008 Appleton et al.
2009/0027418 A1 1/2009 Maru et al.
2009/0088964 A1 4/2009 Schaaf et al.
2009/0100018 A1 4/2009 Roberts
2009/0115786 A1 5/2009 Shimasaki et al.
2009/0132921 A1 5/2009 Hwangbo et al.
2009/0132953 A1 5/2009 Reed, Jr. et al.
2009/0144262 A1 6/2009 White et al.
2009/0158185 A1 6/2009 Lacevic et al.
2009/0171939 A1 7/2009 Athsani et al.
2009/0172511 A1 7/2009 Decherd et al.
2009/0179892 A1 7/2009 Tsuda et al.
2009/0187447 A1 7/2009 Cheng et al.
2009/0187464 A1 7/2009 Bai et al.
2009/0222400 A1 9/2009 Kupershmidt et al.
2009/0292626 A1 11/2009 Oxford et al.
2010/0057716 A1 3/2010 Stefik et al.
2010/0063961 A1 3/2010 Guiheneuf et al.
2010/0070523 A1 3/2010 Delgo et al.
2010/0073201 A1 3/2010 Holcomb et al.
2010/0076968 A1 3/2010 Boyns et al.
2010/0094548 A1 4/2010 Tadman et al.
2010/0106420 A1 4/2010 Mattikalli et al.
2010/0162176 A1 6/2010 Dunton
2010/0185389 A1* 7/2010 Woodard ........... G01C 21/3697 701/532
2010/0185692 A1 7/2010 Zhang et al.
2010/0185984 A1 7/2010 Wright et al.
2010/0198684 A1 8/2010 Eraker et al.
2010/0199225 A1 8/2010 Coleman et al.
2010/0277611 A1 11/2010 Holt et al.
2010/0293174 A1 11/2010 Bennett
2010/0321399 A1 12/2010 Ellren et al.
2011/0022312 A1 1/2011 McDonough et al.
2011/0090254 A1 4/2011 Carrino et al.
2011/0117878 A1 5/2011 Barash et al.
2011/0137766 A1 6/2011 Rasmussen et al.
2011/0153368 A1 6/2011 Pierre et al.
2011/0161096 A1 6/2011 Buehler et al.
2011/0170799 A1 7/2011 Carrino et al.
2011/0208724 A1 8/2011 Jones et al.
2011/0218934 A1 9/2011 Elser
2011/0225198 A1 9/2011 Edwards et al.
2011/0238690 A1 9/2011 Arrasvouri et al.
2011/0270705 A1 11/2011 Parker
2012/0052884 A1* 3/2012 Bogatin .................. G01S 19/48 455/456.6
2012/0066296 A1 3/2012 Appleton et al.
2012/0084118 A1 4/2012 Bai et al.
2012/0106801 A1 5/2012 Jackson
2012/0144335 A1 6/2012 Abeln et al.
2012/0158527 A1 6/2012 Cannelongo
2012/0159363 A1 6/2012 DeBacker et al.
2012/0173276 A1 7/2012 Compton et al.
2012/0173985 A1 7/2012 Peppel
2012/0206469 A1 8/2012 Hulubei et al.
2012/0208636 A1 8/2012 Feige
2012/0221580 A1 8/2012 Barney
2012/0323888 A1 12/2012 Osann, Jr.
2013/0006725 A1 1/2013 Simanek et al.
2013/0021445 A1 1/2013 Cossette-Pacheco et al.
2013/0057551 A1 3/2013 Ebert et al.
2013/0060786 A1 3/2013 Serrano et al.
2013/0073377 A1 3/2013 Heath
2013/0076732 A1 3/2013 Cervelli et al.
2013/0100134 A1 4/2013 Cervelli et al.
2013/0101159 A1 4/2013 Chao et al.
2013/0132398 A1 5/2013 Pfeifle
2013/0150004 A1 6/2013 Rosen
2013/0176321 A1 7/2013 Mitchell et al.
2013/0179420 A1 7/2013 Park et al.
2013/0254900 A1 9/2013 Sathish et al.
2013/0268520 A1 10/2013 Fisher et al.
2013/0275880 A1 10/2013 Bachman et al.
2013/0275922 A1 10/2013 Pinter et al.
2013/0279757 A1 10/2013 Kephart
2013/0282723 A1 10/2013 Petersen et al.
2013/0339891 A1 12/2013 Blumenberg
2014/0148203 A1* 5/2014 Nilsson ............. H04M 3/42348 455/457
2014/0176606 A1 6/2014 Narayan et al.
2014/0218400 A1 8/2014 O'Toole et al.
2014/0310633 A1* 10/2014 McLellan ............... E21B 43/30 715/771
2014/0333651 A1 11/2014 Cervelli et al.
2014/0337772 A1 11/2014 Cervelli et al.
2014/0361899 A1 12/2014 Layson
2015/0029176 A1 1/2015 Baxter
2015/0073941 A1 3/2015 Burrows et al.
2015/0081619 A1 3/2015 Brown et al.
2015/0100907 A1 4/2015 Erenrich et al.
2015/0106170 A1 4/2015 Bonica
2015/0186821 A1 7/2015 Wang et al.
2015/0187036 A1 7/2015 Wang et al.
2015/0187100 A1 7/2015 Berry et al.
2015/0312323 A1 10/2015 Peterson
2015/0338233 A1 11/2015 Cervelli et al.
2015/0356449 A1 12/2015 Vainstein et al.
2015/0379413 A1 12/2015 Robertson et al.
2016/0148417 A1* 5/2016 Kim ..................... G05D 1/0044 345/419
2017/0068880 A1* 3/2017 Itoh .................. G06K 19/06103
2017/0205817 A1* 7/2017 Lyons ..................... H04W 4/80
2020/0310597 A1 10/2020 Hong et al.

FOREIGN PATENT DOCUMENTS

DE 102013222023 A1 1/2015
EP 0763201 3/1997

(56) References Cited

FOREIGN PATENT DOCUMENTS

| | | | |
|---|---|---|---|
| EP | 2575107 | A2 | 4/2013 |
| EP | 2858014 | A2 | 4/2015 |
| EP | 2963595 | A1 | 1/2016 |
| GB | 2516155 | A | 1/2015 |
| NL | 2012778 | A | 11/2014 |
| NZ | 624557 | A | 8/2014 |
| WO | WO-9532424 | A1 | 11/1995 |
| WO | WO-2000009529 | A2 | 2/2000 |
| WO | WO-2001098925 | A2 | 12/2001 |
| WO | WO-2004057268 | A2 | 7/2004 |
| WO | WO-2005013200 | A1 | 2/2005 |
| WO | WO-2008064207 | A2 | 5/2008 |
| WO | WO-2009061501 | A1 | 5/2009 |
| WO | WO-2009123975 | A1 | 10/2009 |
| WO | WO-2011058507 | A1 | 5/2011 |

OTHER PUBLICATIONS

"Amm's diary", Open Street Map, [Online]. Retrieved from the Internet: <URL: http://www.openstreetmap.org/user/amm/diary>, (Accessed: Jul. 23, 2012), 3 pgs.

"Buffer a Polygon", VBForums, [Online]. Retrieved from the Internet: <URL: http://www.vbforums.com/showthread.php?198436-Buffer-a-Polygon>, (Accessed: Oct. 10, 2016), 13 pgs.

"Douglas-Peucker-Algorithmus", Wikipedia (W/ Machine Translation), [Online]. [Archived Jul. 29, 2011]. Retrieved from the Internet: <URL: http://de.wikipedia.org/w/index.php?title=Douglas-Peucker-Algorithmus&oldid=91846042>, (Last Modified: Jul. 29, 2011), 4 pgs.

"GIS-NET 3 Public-Department of Regional Planning", Planning & Zoning Information for Unincorporated LA County, [Online] retrieved from the internet: <http://qis.planning.lacounty.qov/GIS-NET3 Public/Viewer.html>, (Oct. 2, 2013).

"Hunchlab: Heat Map and Kernel Density Calculation for Crime Analysis", Azavea Journal, [Online]. Retrieved from the Internet: <www.azavea.com/blogs/newsletter/v414/kernel-density-capabilities-added-to-hunchlab>, (Sep. 9, 2014), 2 pgs.

"Identify—Defintion", Downloaded Jan. 22, 2015, (Jan. 22, 2015), 1 pg.

"Map Builder: Rapid Mashup Development Tool for Google and Yahoo Maps!", http://web.archive.org/web/20090626224734/http://www.mapbuilder.net/. (Jul. 20, 2012), 2 pgs.

"Map of San Jose, CA", Retrieved Oct. 2, 2013 from http://maps.google.com, (Oct. 2, 2013), 1 pg.

"Map of San Jose, CA.", Retrieved Oct. 2, 2013 from http://maps.yahoo.com, (Oct. 2, 2013), 1 pg.

"Map of San Jose, CA.", Retrieved Oct. 2, 2013 from http://maps.bing.com, (Oct. 2, 2013), 1 pg.

"Overlay—Definition", Downloaded Jan. 22, 2015, (Jan. 22, 2015), 1.

"Ramer-Douglas-Peucker algorithm", Wikipedia, [Online]. [Archived May 31, 2013]. Retrieved from the Internet: <URL: http ://en wikipedia.orglw/index.php?title= Ramer-DouglasPeucker_algorithm &oldid=557739119>, (Last Modified: May 31, 2013), 3 pgs.

"Using the Area of Interest Tools", Sonris, [Online]. Retrieved from the Internet: <URL: http://web.archive.org/web/20061001053327/http://sonris-www.dnr.state.la.us/gis/instruct_files/tutslide12.htm>, (Oct. 1, 2006), 1 pg.

Aquino, J., et al., "JTS Topology Suite", Vivid Solutions, Technical Specifications Version 1.4, (Oct. 17, 2003), 1-36.

Barnes, Diane, et al., "Viewshed Analysis", GIS—ARC/INFO, (2001), 1-10.

Barto, "How To: Create Your Own Points of Interest", How To, [Online]. Retrieved from the Internet: <URL: http://www. poieditor .com/ articles/how to_create your_ own_points_of_interest/>, (Jul. 2, 2008), 4 pgs.

Carver, Steve, et al., "Real-time visibility analysis and rapid viewshed calculation using a voxelbased modelling approach", (Apr. 13, 2012), 6 pgs.

Chen, et al., "Bringing Order to the Web: Automatically Categorizing Search Results", Proceedings of the SIGCHI conference on Human Factors in Computing Systems, The Haque, The Netherlands, (2000), 145-152.

Dramowicz, Ela, "Retail Trade Area Analysis Using the Huff Model", Directions Magazine,, [Online] retrieved from the internet: < http://www.directionsmag.com/articles/retail-trade-area-analysis-using-the-huff-model/123411>, (Jul. 2, 2005), 10 pgs.

Ghosh, Pijush K, "A Solution of Polygon Containment, Spatial Planning, and Other Related Problems Using Minkowski Operations", National Centre for Software Technology, Bombay India, (Feb. 15, 1989), 35 pgs.

Gorr, et al., "Crime Hot Spot Forecasting: Modeling and Comparative Evaluation", Grant 98-IJ-CX-K005, (May 6, 2002), 37 pgs.

Griffith, Daniel A, et al., "A Generalized Huff Model", Geographical Analysis, vol. 14, No. 2, (Apr. 1982), 135-144.

Haralick, Robert M, et al., "Image Analysis Using Mathematical Morphology", IEE Transactions on pattern analysis and machine intelligence, vol. PAMI-9, (Jul. 4, 1987), 19 pgs.

Hibbert, et al., "Prediction of Shopping Behavior Using a Huff Model Within a GIS Framework", (Mar. 18, 2011), 16 pgs.

Huang, Da Wei, et al., "Systematic and Integrative Analysis of Large Gene Lists Using DAVID Bioinformatics Resources", Nature Protocols, 4.1, (Dec. 2008), 44-57.

Huff, et al., "Calibrating the Huff Model Using ArcGIS Business Analyst", ESRI, (Sep. 2008), 33 pgs.

Huff, David L, "Parameter Estimation in the Huff Model", ESRI, ArcUser, (2003), 34-36.

Ipbucker, C, et al., "Inverse Transformation for Several Pseudo-cylindrical Map Projections Using Jacobian Matrix", ICCSA 2009, Part 1 LNCS 5592, (2009), 2 pgs.

Levine, Ned, "Crime Mapping and the Crimestat Program", Geographical Analysis, vol. 38, (2006), 41-56.

Liu, T., "Combining GIS and the Huff Model to Analyze Suitable Locations for a New Asian Supermarket in the Minneapolis and St. Paul, Minnesota USA", Papers in Resource Analysis, 2012, vol. 14, (2012), 8 pgs.

Mandagere, Nagapramod, "Buffer Operations in GIS", [Online]. Retrieved from the Internet: <URL: http://www-users.cs.umn.edu/~npramod/enc_pdfpdf>, (Printed: Jan. 20, 2010), 7 pgs.

Murray, C, "Oracle Spatial Developer's Guide-6 Coordinate Systems ( Spatial Reference Systems)", [Online]. Retrieved from the Internet:<URL:http://docs.oracle.com/cd/B28359_01/appdev.111/b28400.pdf>, (Jun. 2009), 870 pgs.

Pozzi, F., et al., "Vegetation and Population Density in Urban and Suburban Areas in the USA", Presented at the Third International Symposium of Remote Sensing of Urban Areas; Istanbul, Turkey, Jun. 2002, (Jun. 2002), 8 pgs.

Qiu, Fang, "3D Analysis and Surface Modeling", Power point presentation, 26 pgs.

Reddy, Martin, et al., "Under the Hood of GeoVRML 1.0", Proceeding VRML '00 Proceedings of the fifth symposium on Virtual reality modeling language (Web3D-VRML), (2000). 7.

Reibel, M., et al., "Areal Interpolation of Population Counts Using Pre-classified Land Cover Data", Popul Res Policy Rev. 26, (Sep. 19, 2007), 619-633.

Reibel, M., et al., "Geographic Information Systems and Spatial Data Processing in Demography: a Review", Popul Res Policy Rev (2007) 26, (Sep. 6, 2007), 601-618.

Rizzardi, M., et al., "Interfacing U.S. Census Map Files With Statistical Graphics Software: Application and Use in Epidemiology", Statistics in Medicine, vol. 12, (1993), 1953-1964.

Snyder, John P, "Map Projections—A Working Manual", U.S. Geological Survey Professional Paper, 1395, (1987), 29 pgs.

Tangelder, J W.H, et al., "Freeform Shape Machining Using Minkowski Operations", (Jun. 1996), 12 pgs.

Thompson, Mick, "Getting Started with GEO", (Jul. 26, 2011), 3 pgs.

Turner, Andy, "Andy Turner's GISRUK 2012 Notes", Google Drive—https://docs.google.com/document/d/1cTmxg7mVx5gd89lqbICYvDEnHA4QAivH417WpyPsqE4edit?pli=1, (Sep. 16, 2013), 1-15.

(56) References Cited

OTHER PUBLICATIONS

Valentini, Giorgio, et al., "Ensembles of Learning Machines", Lecture Notes in Computer Science: Neural Nets, Springer Berlin Heidelberg, (Sep. 26, 2002), 3-20.
Wongsuphasawat, Krist, et al., "Visual Analytics for Transportation Incident Data Sets", Transportation Research Record: Journal of the Transportation Research Board, No. 2138, (2009), 135-145.
Woodbridge, Stephen, "Polygon Simplification", [Online]. Retrieved from the Internet:<URL:http://lists.osgeo.org/pipermail/geos-devel/2011-May/005210.html>, (May 8, 2011), 2 pgs.
"U.S. Appl. No. 12/840,673, Final Office Action mailed Jan. 2, 2015", 21 pgs.
"U.S. Appl. No. 12/840,673, Non Final Office Action mailed Sep. 17, 2014", 21 pgs.
"U.S. Appl. No. 12/840,673, Notice of Allowance mailed Apr. 6, 2015", 11 pgs.
"U.S. Appl. No. 13/728,879, Final Office Action mailed Aug. 12, 2015", 9 pgs.
"U.S. Appl. No. 13/728,879, First Action Interview Office Action Summary mailed Mar. 17, 2015", 5 pgs.
"U.S. Appl. No. 13/728,879, First Action Interview Pre-Interview Communication mailed Jan. 27, 2015", 4 pgs.
"U.S. Appl. No. 13/728,879, Non Final Office Action mailed Nov. 20, 2015", 9 pgs.
"U.S. Appl. No. 13/728,879, Notice of Allowance mailed Jun. 21, 2016", 13 pgs.
"U.S. Appl. No. 13/917,571, Issue Notification mailed Aug. 5, 2014", 1 pg.
"U.S. Appl. No. 13/948,859, Notice of Allowance mailed Dec 10, 2014", 8 pgs.
"U.S. Appl. No. 14/289,596, Advisory Action mailed Apr. 30, 2015", 3 pgs.
"U.S. Appl. No. 14/289,596, Final Office Action mailed Jan. 26, 2015", 38 pgs.
"U.S. Appl. No. 14/289,596, First Action Interview Pre-Interview Communication mailed Jul. 18, 2014", 4 pgs.
"U.S. Appl. No. 14/289,596, Non Final Office Action mailed May 9, 2016", 37 pgs.
"U.S. Appl. No. 14/289,599, Advisory Action mailed Sep. 4, 2015", 24 pgs.
"U.S. Appl. No. 14/289,599, Final Office Action mailed May 29, 2015", 8 pgs.
"U.S. Appl. No. 14/289,599, First Action Interview Pre-Interview Communication mailed Jul. 22, 2014", 5 pgs.
"U.S. Appl. No. 14/294,098, Final Office Action mailed Nov. 6, 2014", 22 pgs.
"U.S. Appl. No. 14/294,098, First Action Interview Pre-Interview Communication mailed Aug. 15, 2014", 17 pgs.
"U.S. Appl. No. 14/294,098, Notice of Allowance mailed Dec 29, 2014", 9 pgs.
"U.S. Appl. No. 14/319,161, Final Office Action mailed Jan. 23, 2015", 21 pgs.
"U.S. Appl. No. 14/319,161, Notice of Allowance mailed May 4, 2015", 6 pgs.
"U.S. Appl. No. 14/490,612, Final Office Action mailed Aug. 18, 2015", 71 pgs.
"U.S. Appl. No. 14/730,123, Notice of Allowance mailed Apr. 12, 2016", 10 pgs.
"U.S. Appl. No. 14/730,123, Pre-Interview First Office Action mailed Sep. 21, 2015", 4 pgs.
"U.S. Appl. No. 14/929,584, Final Office Action mailed May 25, 2016", 42 pgs.
"U.S. Appl. No. 14/929,584, Non Final Office Action mailed Feb. 4, 2016", 15 pgs.
"U.S. Appl. No. 14/934,004, First Action Interview Pre-Interview Communication mailed Feb. 16, 2016", 5 pgs.
"U.S. Appl. No. 15/082,307, Final Office Action mailed Mar. 21, 2019", 21 pgs.
"U.S. Appl. No. 15/082,307, Final Office Action mailed Oct. 18, 2018", 20 pgs.
"U.S. Appl. No. 15/082,307, Final Office Action mailed Nov. 19, 2019", 12 pgs.
"U.S. Appl. No. 15/082,307, First Action Interview—Office Action Summary mailed Jun. 14, 2018", 2 pgs.
"U.S. Appl. No. 15/082,307, First Action Interview—Pre-Interview Communication mailed Apr. 18, 2018", 7 pgs.
"U.S. Appl. No. 15/082,307, Non Final Office Action mailed Jan. 30, 2019", 23 pgs.
"U.S. Appl. No. 15/082,307, Non Final Office Action mailed Jun. 26, 2019", 13 pgs.
"U.S. Appl. No. 15/082,307, Response filed Mar. 1, 2019 to Non Final Office Aciton mailed Jan. 30, 2019", 11 pgs.
"U.S. Appl. No. 15/082,307, Response filed Jan. 17, 2019 to Final Office Action mailed Oct. 18, 2018", 10 pgs.
"U.S. Appl. No. 15/082,307, Response filed Jun. 14, 2019 to Final Office Action mailed Mar. 21, 2019", 10 pgs.
"U.S. Appl. No. 15/082,307, Response filed Jul. 11, 2018 to First Action Interview—Office Action Summary mailed Jun. 14, 2018", 18 pgs.
"U.S. Appl. No. 15/082,307, Response filed Sep. 18, 2019 to Non-Final Office Action mailed Jun. 26, 2019", 12 pgs.
"Australian Application Serial No. 2012216622, Office Action Mailed Jan. 6, 2015", 2 pgs.
"Australian Application Serial No. 2014202442, Office Action mailed Mar. 19, 2015", 5 pgs.
"Australian Application Serial No. 2014213553, Office Action Mailed May 7, 2015", 2 pgs.
"Australian Application Serial No. 2017203143, First Examination Report mailed Dec 19, 2017", 3 pgs.
"Australian Application Serial No. 2017203143, Response filed Jun. 29, 2018 to Subsequent Examiners Report mailed Mar. 13, 2018", 20 pgs.
"Australian Application Serial No. 2017203143, Response filed Sep. 7, 2018 to Third Examiners Report mailed Aug. 3, 2018", 23 pgs.
"Australian Application Serial No. 2017203143, Response filed Dec 19, 2017 to First Examination Report mailed Dec 19, 2017", 2 pgs.
"Australian Application Serial No. 2017203143, Subsequent Examiners Report mailed Mar. 13, 2018", 3 pgs.
"Australian Application Serial No. 2017203143, Subsequent Examiners Report mailed Oct. 12, 2018", 4 pgs.
"Australian Application Serial No. 2017203143, Third Examiners Report mailed Aug. 3, 2018", 4 pgs.
"European Application Serial No. 14187739.9, Extended European Search Report mailed Jul. 6, 2015", 9 pgs.
"European Application Serial No. 17163145.0, Communication pursuant to Article 94(3) EPC mailed Mar. 7, 2019", 12 pgs.
"European Application Serial No. 17163145.0, Extended European Search Report mailed Aug. 16, 2017", 11 pgs.
"European Application Serial No. 17163145.0, Response filed Apr. 3, 2018 to Extended European Search Report mailed Aug. 16, 2017", 18 pgs.
"European Application Serial No. 17163145.0, Response filed Jul. 4, 2019 to Communication pursuant to Article 94(3) EPC mailed Mar. 7, 2019", 13 pgs.
"Great Britain Application Serial No. 1408025.3, Office Action mailed Nov. 6, 2014", 3 pgs.
"Map of San Jose, CA", Bing, [Online] retrieved from the internet: <http://maps.bing.com>, (Oct. 2, 2013), 1 pg.
"Map of San Jose, CA", Google, [Online] retrieved from the internet: <http://maps.google.com>, (Oct. 2, 2013), 1 pg.
"Netherlands Application Serial No. 2011632, Netherlands Search Report mailed Feb. 8, 2016", w/ English Translation, 9 pgs.
"Netherlands Application Serial No. 2012778, Netherlands Search Report mailed Sep. 22, 2015", w/ English Translation, 10 pgs.
"New Zealand Application Serial No. 628585, Office Action mailed Aug. 26, 2014", 2 pgs.
"New Zealand Application Serial No. 628840, Office Action mailed Aug. 28, 2014", 2 pgs.
Paul, Zandbergen A, et al., "Accuracy of iPhone Locations: A Comparison of Assisted GPS, WiFi and Cellular Positioning", Transactions in GIS vol. 13, (Jun. 1, 2009), 5-25.

(56) References Cited

OTHER PUBLICATIONS

Waga, K, et al., "System for real time storage, retrieval and visualization of GPS tracks", International Conference on System Theory, Control and Computing (ICSTCC), (Oct. 12, 2012), 1-5.
"U.S. Appl. No. 15/082,307, Final Office Action mailed Jul. 7, 2020", 12 pgs.
"U.S. Appl. No. 15/082,307, Non Final Office Action mailed Feb. 20, 2020", 10 pgs.
"U.S. Appl. No. 15/082,307, Response filed Feb. 5, 2020 to Final Office Action mailed Nov. 19, 2019", 10 pgs.
"U.S. Appl. No. 15/082,307, Response filed Jun. 19, 2020 to Non Final Office Action mailed Feb. 20, 2020", 11 pgs.
"European Application Serial No. 17163145.0, Summons to Attend Oral Proceedings mailed Jan. 20, 2020", 3 pgs.
"European Application Serial No. 17163145.0, Summons to Attend Oral Proceedings mailed Nov. 8, 2019", 14 pgs.
U.S. Appl. No. 15/082,307, filed Mar. 28, 2016, Interactive Map Interface Depicting User Activity.

* cited by examiner

DISPLAYING AN UPDATE TO A GEOGRAPHICAL AREA

RELATED APPLICATIONS

This application claims the priority benefit of U.S. Provisional Application No. 62/337,052, entitled "DISPLAYING AN UPDATE TO A GEOGRAPHICAL AREA," filed May 16, 2016, which is hereby incorporated herein by reference in its entirety.

TECHNICAL FIELD

Embodiments of the present disclosure relate generally to transmitting data that causes display of a geographical area. More particularly, but not by way of limitation, the embodiments relate to receiving updates to the geographical area and transmitting data to modify the geographical area displayed in one or more devices in communication with a server.

BACKGROUND

Conventionally, users can view a map of a geographical area on their devices. Further, the map generally depicts information with regards to various locations within the geographical area. However, often times, the content included in the map cannot be changed, annotated, or edited by users that are viewing the map. As a result, users are unable to share their changes, annotations, or edits with other users in an efficient manner. Also, often times, the content included in the map relates only to brick-and-mortar locations. Therefore, the data included in conventional maps is limited to only brick-and-mortar locations.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

In various example embodiments, a system is configured to display a geographical area on one or more user devices. In some instances, the geographical area includes artifacts that correspond to geospatial data within the geographical area. In some instances, the geospatial data indicates events, objects, paths, or landmarks that are within the geographical area. Further, the system transmits data that causes display of the geographical area to each of the one or more user devices. Effectively, each of the one or more user devices is viewing the same geographical area.

In various example embodiments, the system is further configured to receive an indication of an update to the geographical area. The update may include an additional artifact, a modification of an artifact, selection of an area in the geographical area to add an artifact, adding a connection between two artifacts within the geographical area, changing the color of an artifact within the geographical area, updating the position of an artifact in the geographical area and the like. Once the indication of the update is received, the system may generate the update and modify the geographical area. Once modified, the system transmits the modified geographical area to each of the one or more user devices.

In various example embodiments, the system is configured to annotate the artifacts included in the geographical area. In this regard, the system is further configured to receive annotations to the artifacts that are displayed in the geographical area.

Figure 1:
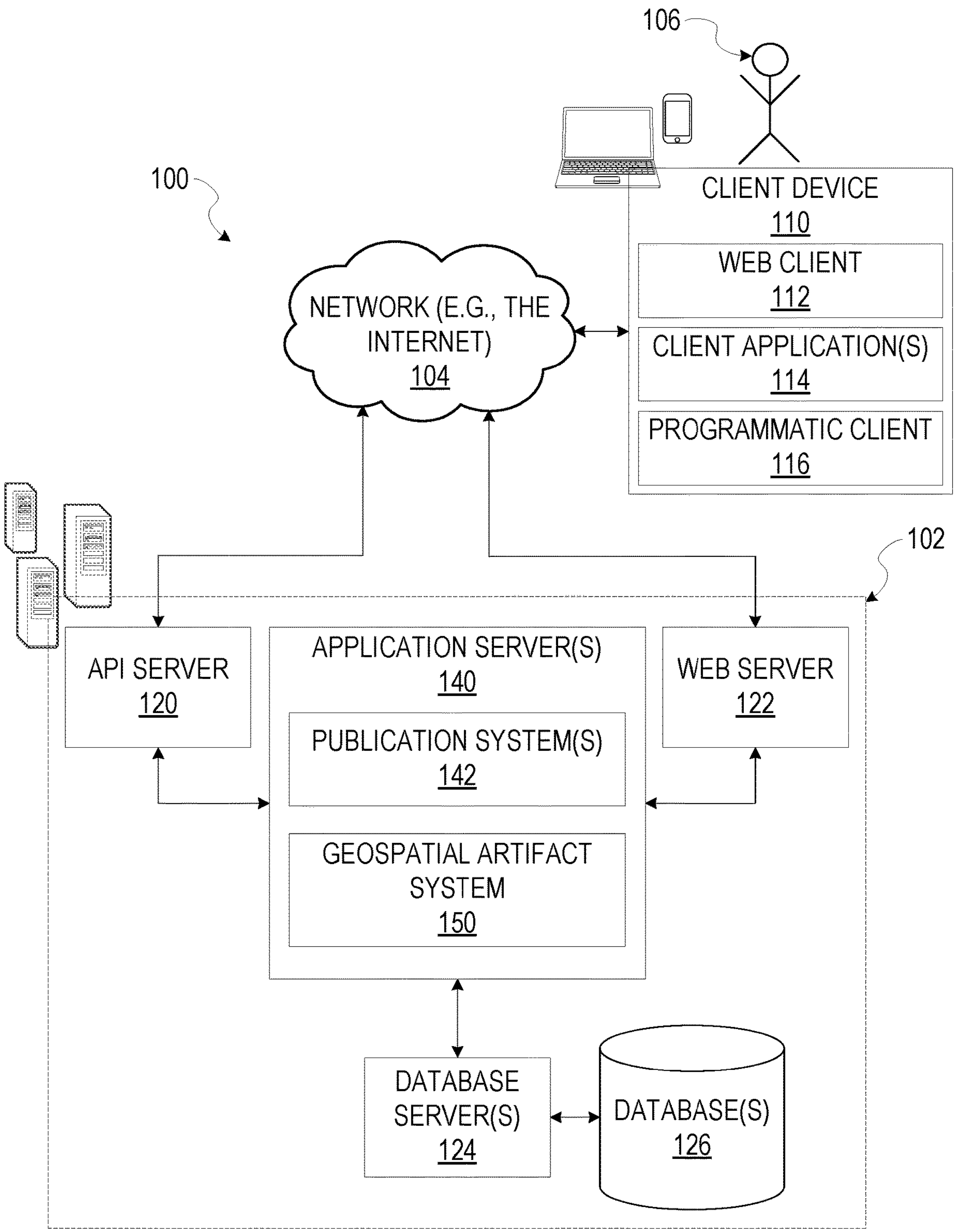
FIG. 1 is a block diagram illustrating a networked system, according to some example embodiments.

With reference to FIG. 1, an example embodiment of a high-level client-server-based network architecture 100 is shown. A networked system 102, in the example forms of a network-based geographic publication system, provides server-side functionality via a network 104 (e.g., the Internet or wide area network (WAN)) to one or more client devices 110. FIG. 1 illustrates, for example, a web client 112 (e.g., a browser), a client application 114, and a programmatic client 116 executing on client device 110.

The client device 110 may comprise, but is not limited to, a mobile phone, desktop computer, laptop, smart phones, tablets, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction within the networked system 102. In one embodiment, the networked system 102 is a network-based geographic publication system that responds to requests for viewing a geographical area, and generates or renders a geographical area that includes artifacts that correspond to geospatial data. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, a geographical map application, and the like.

One or more users 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 hosts a geographic publication system 142, which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or geographical landmarks) to the geographic publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, or publication, that are supported by the relevant applications of the networked system 102.

The geographic publication system 142 provides a number of publication functions and services to users 106 that access the networked system 102. While the geographic publication system 142 is shown in FIG. 1 to both form part of the networked system 102, it will be appreciated that, in alternative embodiments, the geographic publication system 142 may form a service that is separate and distinct from the networked system 102.

The geospatial artifact system 150 provides functionality operable to cause display of a user interface that depicts a geographical area. The geospatial artifact system 150 further has functionality operable to update the geographical area. In some instances, the geospatial artifact system 150 generates the user interface that depicts the geographical area using data (e.g., geospatial data) retrieved from the databases 126, the third party servers 130, the geographic publication system 142, and other sources. In some example embodiments, the geospatial artifact system 150 receives from one or more client devices an indication of an update to the geographical area. Further, the geospatial artifact system 150 modifies the user interface to include the update. In some example embodiments, the geospatial artifact system 150 communicates with the geographic publication system 142 (e.g., accessing a map of a geographical area). In an alternative embodiment, the geospatial artifact system 150 may be a part of the geographic publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various geographic publication system 142, and geospatial artifact system 150 could also be implemented as standalone software programs, which do not necessarily have networking capabilities.

The web client 112 accesses the various publication systems 142 via the web interface supported by the web server 122. Similarly, the programmatic client 116 accesses the various services and functions provided by the publication systems 142 via the programmatic interface provided by the API server 120. The programmatic client 116 may, for example, be a map application to enable users to view a user interface depicting a geographical area in an off-line manner, and to perform batch-mode communications between the programmatic client 116 and the networked system 102.

Figure 2:
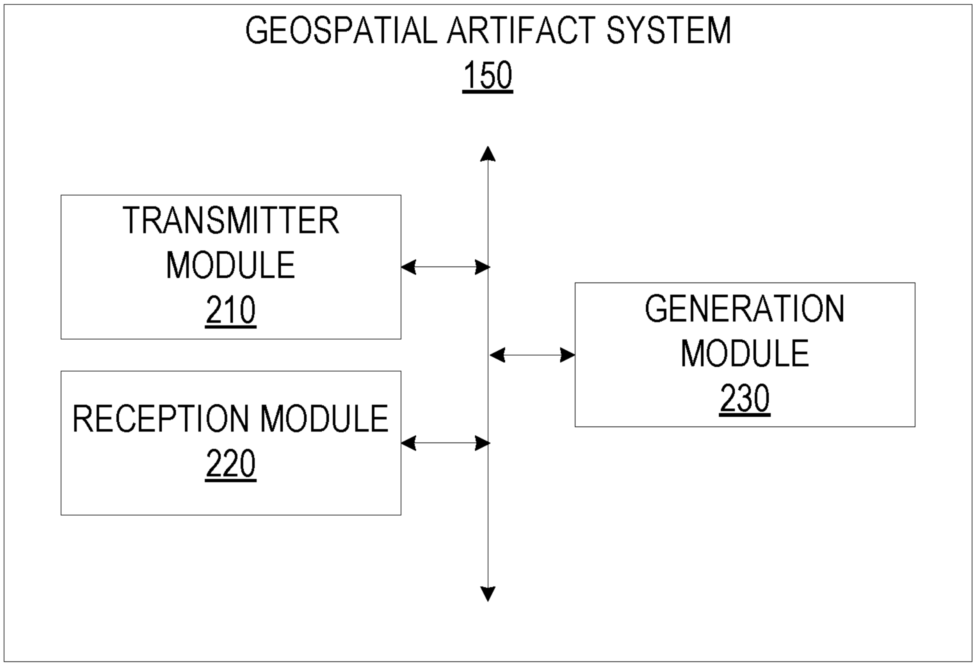
FIG. 2 is a block diagram illustrating components of a geospatial artifact system, according to some example embodiments.

FIG. 2 is a block diagram illustrating components of the geospatial artifact system 150, according to some example embodiments. The geospatial artifact system 150 is shown as including a transmitter module 210, a reception module 220, and a generation module 230, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the transmitter module 210 is configured to transmit data that causes display of a geographical area. In various example embodiments, the transmitter module 210 communicates with one or more client devices (e.g., client device 110) over a network (e.g., network 104). In further example embodiments, the transmitter module 210 accesses a database (e.g., database 126) in order to retrieve geospatial data or any other data that is displayed in the geographical area. Moreover, the transmitter module 210 is further configured to transmit, to each of the one or more devices, any modifications or updates to the geographical area. For instance, after the geographical area is updated, the transmitter module 210 transmits data to each of the one or more devices, the data corresponding to the updated geographical area. In various embodiments, the data that causes display of the geographical area is a link that navigates a client device over to a web page that displays the geographical area.

In various example embodiments, the reception module 220 is configured to receive information or data from the one or more client devices. In further embodiments, the reception module 220 receives an indication of an update to the geographical area. Accordingly, the reception module 220 communicates with the one or more devices over the network.

In various example embodiments, the generation module 230 is configured to generate data that is used to cause display of the geographical area. In other words, the generation module 230 generates a depiction of the geographical area. Moreover, the generation module 230 generates additional information that is displayed in the geographical area. For example, in further embodiments, the generation module 230 is configured to generate the update to the geographical area. Also, the generation module 230 is configured to modify the geographical area to include the generated update to the geographical area. In further embodiments, the generation module 230 generates a panel that is selectable to indicate the update to the geographical area. Once the geographical area is generated by the generation module 230, it may be stored in a database and accessed upon request.

In further example embodiments, the generation module 230 is configured to generate an output depicts an analysis of the geospatial data. For example, the generation module 230 generates a histogram of the geospatial data based on their associated characteristics or properties. Thereafter, the transmitter module 210 transmits the output to the client devices to cause display of the output on the client devices.

Figure 3:
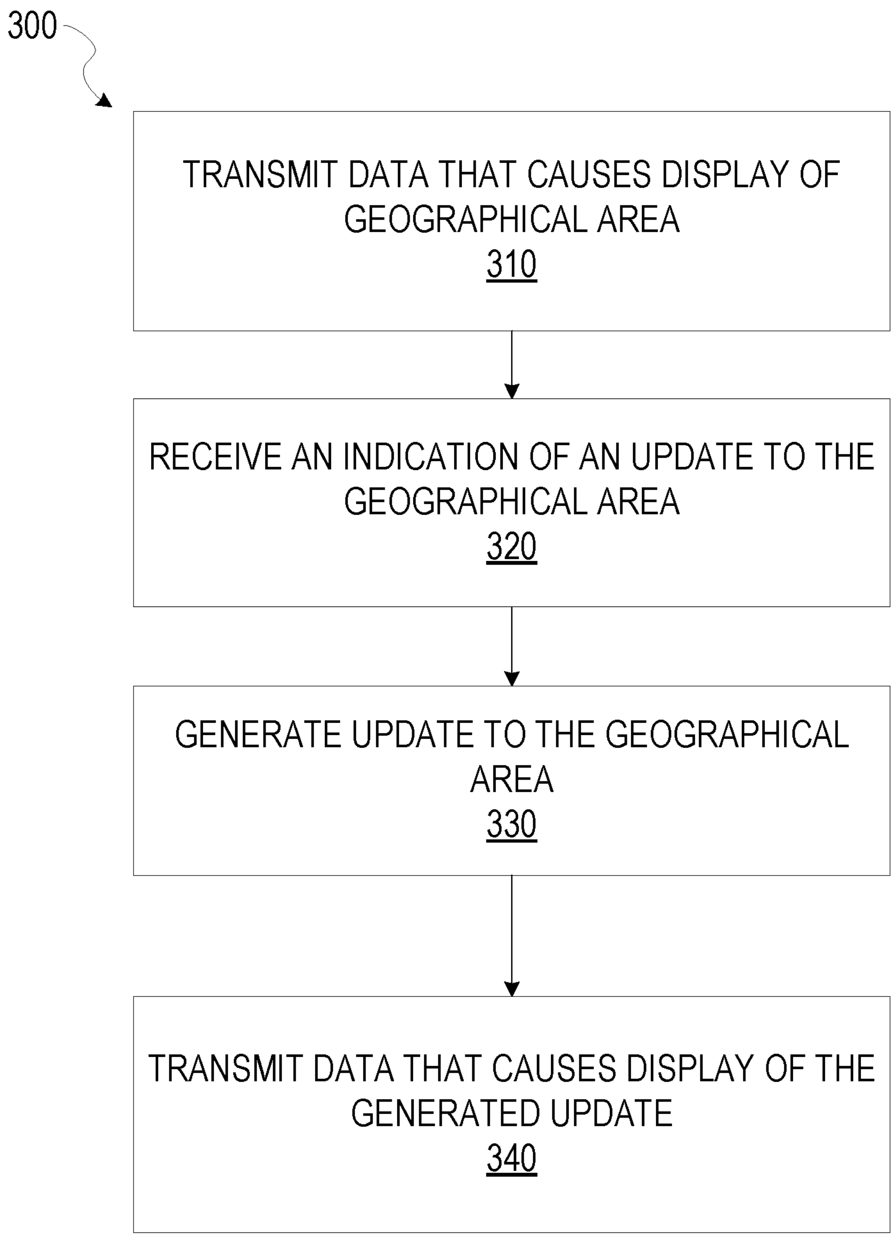
FIG. 3-6 are flowcharts illustrating operations of the geospatial artifact system in performing a method of transmitting data that causes display of a modified geographical area, according to some example embodiments.

FIG. 3-6 are flowcharts illustrating operations of the geospatial artifact system 150 in performing a method 300 of transmitting data that causes display of a modified geographical area, according to some example embodiments. Operations in the method 300 may be performed by the geospatial artifact system 150, using modules described above with respect to FIG. 2. As shown in FIG. 3, the method 300 includes operations 310, 320, 330, and 340.

At operation 310, the transmitter module 210 transmits data that causes display of a geographical area on each of one or more devices. The geographical area is an area that includes one or more geospatial artifacts. Accordingly, in addition to causing display of the geographical area, the transmitter module 210 transmits data that causes display of one or more geospatial artifacts within the geographical area. In other words, the transmitter module 210 places the one or more geospatial artifacts at respective locations within the geographical area. In some instances, the one or more geospatial data is included in a layer. The layer, in some instances, is data that indicates a group of geospatial artifacts and their corresponding locations within the geographical area. Therefore, the transmitter module 210 is also configured to transmit a layer to each of the one or more devices.

In some instances, the layer is generated by the generation module 230. Alternatively, the layer is previously generated and received by the reception module 220 as data (e.g., KML, KMZ file).

A geospatial artifact corresponds to geospatial data that indicates a significance of a location within the geographical area. Further, the geospatial data includes various types of data such as event data, object data, path data, landmark data, annotation data, sensor data, user-generated annotation data, and the like. For example, in some instances, the geospatial data indicates an event that occurs at a specific location within the geographical area (e.g., type of event, number of people attending, time of event). As another example, the geospatial data indicates locations of certain objects within the geographical area (e.g., vehicles, personnel, or buildings). The geospatial data may also indicate paths or trails within the geographical area. In further instances, the geospatial data indicates a landmark or a brick and mortar location within the geographical area. As another example, the geospatial data may indicate the location of a heavily congested area for traffic. Accordingly, a geospatial artifact that corresponds to the location of the heavily congested area is displayed in the geographical area. Since the geospatial data includes various types of data, the geospatial artifact may also include a symbol to depict the type of geospatial data corresponding to the geospatial artifact. In various example embodiments, the user-generated annotation data includes text, symbols, or a combination of both. Further, the user-generated annotation data annotates the geospatial artifacts that are included within the geographical area. In various example embodiments, the geographical area is being displayed simultaneously on the one or more devices. Effectively, each of the one or more devices is viewing the same geographical area.

In various example embodiments, the transmitter module 210 assigns a permission to each of the one or more devices. In further embodiments, the transmitter module 210 assigns permission(s) to user accounts of the one or more devices. The permission indicates whether the device is authorized to view or edit certain artifacts within the geographical area. As a result, the transmission of data that causes display of certain artifacts is based on the assigned permission of each of the one or more devices. In some example embodiments, the transmitter module 210 assigns a permission to an account registered with a user. The permission indicates whether the account is authorized to view or edit certain artifacts within the geographical area. In this particular instance, the transmitter module 210 transmits data that causes display of the certain artifacts to devices that are linked or associated with the account registered with the user.

At operation 320, the reception module 220 receives an indication of an update to a geographical area. In various example embodiments, the indication of the update to the geographical area is received from a device that displays the geographical area. In other words, the indication of the update is received from a device on which the geographical area is currently being displayed (e.g., the one or more devices of which data is transmit). Moreover, the update to the geographical area includes various changes to the geographical area, such as addition of or modification of artifacts within the geographical area, as further explained in FIG. 4.

In further example embodiments, the reception module 220 receives user-generated annotation data which includes text or symbols. The user-generated annotation data is used to annotate the geospatial artifacts that are included within the geographical area. For example, the annotation data includes a description of what the geospatial artifact represents in the geographical area.

At operation 330, the generation module 230 generates the update to the geographical area based on the received indication of the update. In other words, the generation module 230 generates or creates a graphical depiction of the update. Effectively, the generation module 230 modifies the geographical area to include the graphical depiction of the update, the modification being based on the received indication of the update. In various example embodiments, the generation module 230 generates a map of the geographical area that includes a modification (e.g., the generated update) to the geographical area that was indicated at the operation 310. In further example embodiments, the generation module 230 annotates the geospatial artifacts that are included within the geographical area with the annotation data received by the reception module 220.

At operation 340, the transmitter module 210 transmits data that causes display of the generated update to the geographical area on each of the one or more devices. In other words, each of the one or more devices receives the data being transmitted by the transmitter module 210. In various example embodiments, the transmitter module 210 transmits the map of the geographical area that includes the modification as rendered in the operation 330.

In some example embodiments, the transmitter module 210 saves the geospatial data in a database (e.g., database 126). In some embodiments, the transmitter module 210 saves the data that causes display of the generated update in the database (database 126). As a result, any updates made to the geographical area are stored in the database. Once stored, a subset or portion of the updates are retrieved and displayed in the geographical area. For example, updates to only a certain section of the geographical area are retrieved from the database and transmitted, by the transmitter module 210, to the client device. As another example, updates that occur over a certain period of time are retrieved from the database and transmitted, by the transmitter module 210, to the client device.

Figure 4:
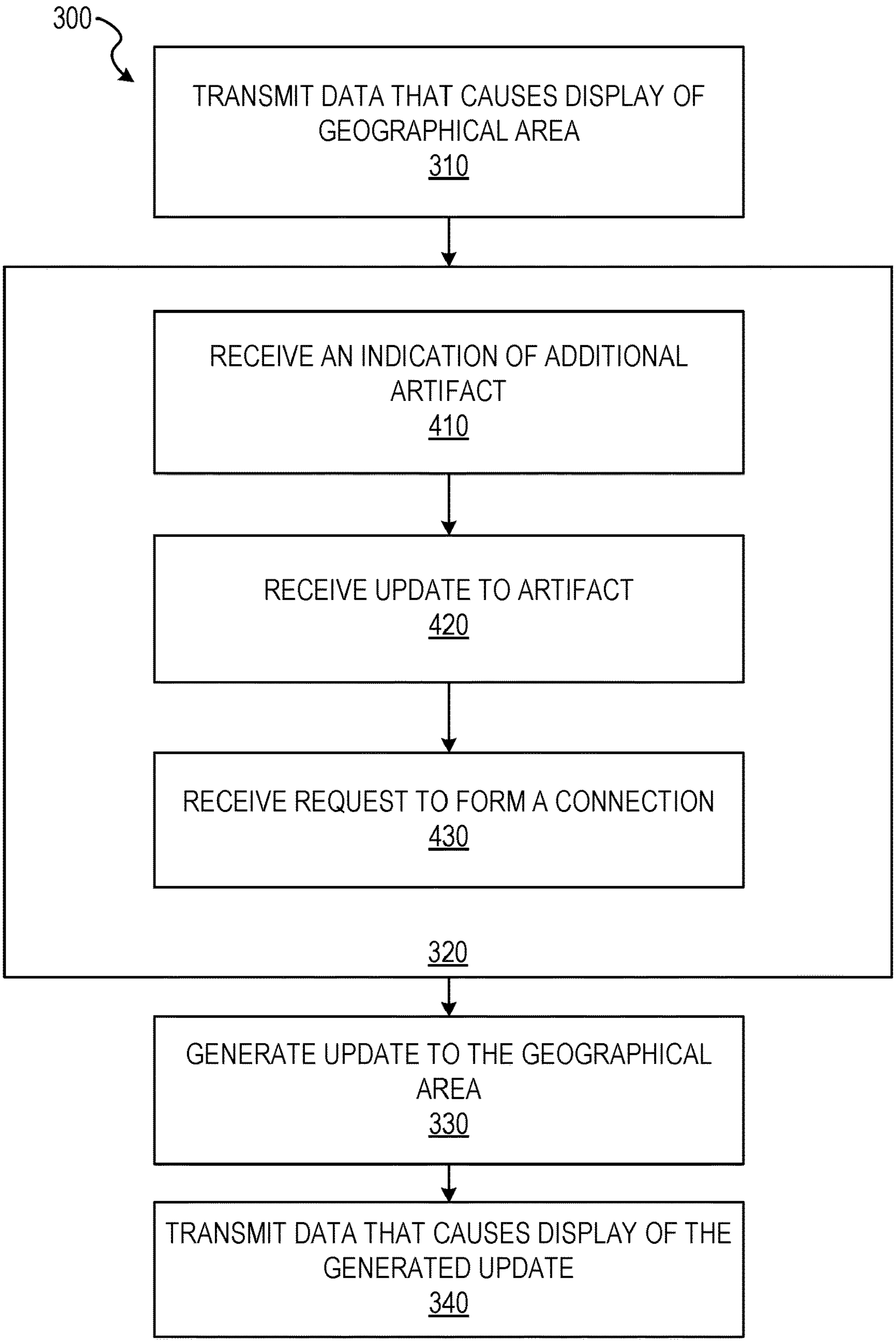

As shown in FIG. 4, the method 300 includes operations 410, 420, and 430. Moreover, the operations 410-430 may be performed as part (e.g., a precursor task, a subroutine, or a portion) of operation 320.

At operation 410, the reception module 220 receives an indication of an additional artifact to include in the geographical area. The additional artifact, in some instances, corresponds to new geospatial data that indicates significance of a further location within the geographical area. Moreover, the additional artifact may result from an event. In other words, an occurrence of the event may trigger or cause information on a certain location within the geographical area to become significant or meaningful. Moreover, the indication of the additional artifact, in some instances, also indicates a further location within the geographical area. In response, the generation module 230 generates the additional artifact (e.g., generates a graphical depiction of the additional artifact) at the further location within the geographical area. Also in response, the transmitter module 210 transmits the generated additional artifact to each of the one or more devices.

At operation 420, the reception module 220 receives an indication of an update to the artifact placed at the location in the geographical area. The update to the artifact includes updating a characteristic of the artifact. For example, the update to the artifact may include changing a status of the artifact from a previous status to a new status, changing a shape of the artifact, changing a type of the artifact, changing a location of the artifact, and the like. The update to the artifact, in some instances, also includes changing a color of the artifact from a previous color to a new color. Moreover, the update to the artifact may result from an event. In other words, an occurrence of the event may cause information about a certain location within the geographical area to change. In response, the generation module 230 generates the update to the artifact (e.g., generates a graphical depiction of the update to the artifact) based on the received indication of the update to the artifact. Moreover, the generation module 230 modifies the artifact based on the received indication of the update to the artifact. Also in response, the transmitter module 210 transmits the generated update to the artifact to each of the one or more devices. In further embodiments, the updates to the artifact occur immediately upon creation of the artifact.

At operation 430, the reception module 220 receives a request to form a connection between two or more artifacts that are located within the geographical area. In some instances, the connection between the two or more artifacts indicates a relationship between the two or more artifacts. For example, in some instances, a connection between a first and second artifact signals that the two artifacts correspond to geospatial data that results from a single event. As another example, a connection between the two artifacts signals that the two artifacts represents objects that are related to one another. As another example, the connection between the two artifacts signals that the two artifacts represent an entrance and an exit for a specific path within the geographical area. In response, the generation module 230 generates the connection between the two artifacts (e.g., generates a graphical depiction of the connection between the two artifacts). Also in response, the transmitter module 210 transmits the generated connection to each of the one or more devices.

Figure 5:
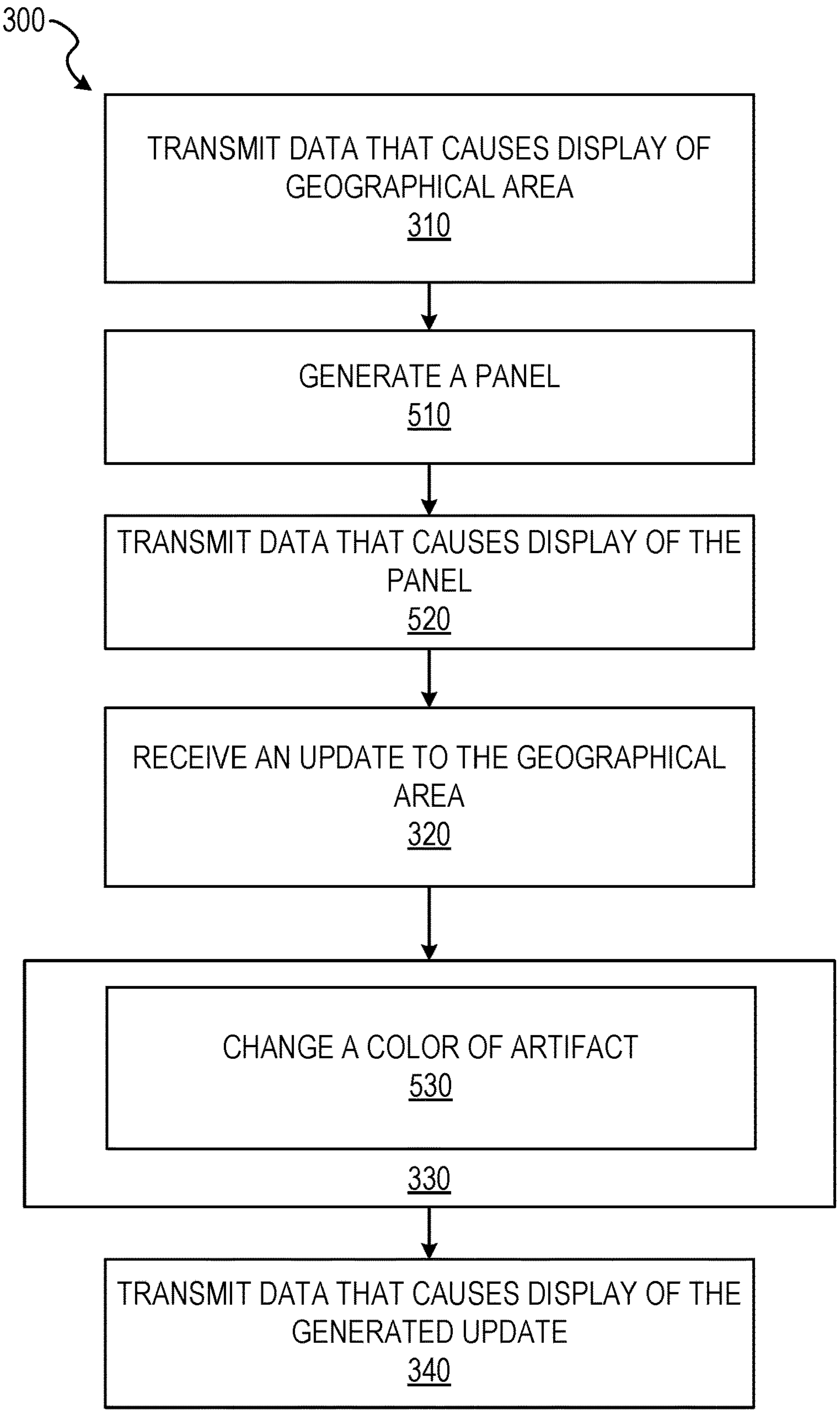

As shown in FIG. 5, the method 300 includes operations 510, 520, and 530. One or more of operations 510 and 520 may be performed prior to the operation 320 (e.g., precursor tasks). Moreover, the operation 530 may be performed as part of the operation 330 (e.g., a subroutine).

At operation 510, the generation module 230 generates a panel (e.g., menu) that is selectable to indicate the update to the geographical area. In other words, the generated panel displays options that a user can select from. The generated panels may provide custom logic to interact with the geographical areas. For example, a generated panel may provide functionality to highlight artifacts based on a time filter. In addition, a generated panel may allow for segmenting artifacts based on numeric heuristics. Moreover, each of the displayed options corresponds to an update that can be performed to the geographical area (e.g., generated by the generation module 230). For example, the indication of the additional artifact to be included in the geographical area is displayed as an option in the generated panel. As a further example, the update to the artifact is displayed as an option in the generated panel.

Moreover, in various example embodiments, the generated panel includes or indicates one or more predefined symbols that each represents a respective type of geospatial data. As stated above, the types of geospatial data may include event data, object data, path data, annotation data, and the like. Accordingly, a first symbol may be used to represent an event that takes place within the geographical area. As another example, a second symbol may be used to represent a path (e.g., entrance or an exit) within the geographical area. Together, these symbols may be used to represent a complex series of actions or plans. In further embodiments, the generated panel includes tool for the user to draw a custom symbol.

At operation 520, the transmitter module 210 transmits data that causes display of the generated panel. The transmitter module 210 transmits the data that causes display of the generated panel to each device being used to display the geographical area. Once transmitted, the reception module 220, in various example embodiments, receives a selection of a predefined symbol from the generated panel. The selection of the predefined symbol is received from one of the devices that received the data, transmitted by the transmitter module 210, to cause display of the generated panel. In response to receiving the selection of the predefined symbol at the reception module 220, the generation module 230 generates an artifact corresponding to the predefined symbol at a further location in the geographical area. The section of the predefined symbol may also indicate the further location in the geographical area. For example, a user may select the predefined symbol and drag it onto the further location in the geographical area. In various example embodiments, the transmitter module 210 transmits data that causes display of the artifact corresponding to the predefined symbol on each of the one or more devices.

In some instances, the user may draw or create a custom symbol that is different than the predefined symbols from the generated panel. The reception module 220 may receive the custom symbol from the device and the generation module 230 generates an artifact corresponding to the custom symbol at the further location in the geographical area. This symbol may be stored for future usage, either by the user who created it, or in a library for use by other users. In various example embodiments, the transmitter module 210 transmits data that causes display of the artifact corresponding to the custom symbol on each of the one or more devices.

At operation 530, the generation module 230 changes a color of the artifact from a first color to a second color based on the received update. In some instances, the first color represents a previous status of the artifact. Moreover, the second color represents a new status of the artifact. In various example embodiments, the previous status of the artifact corresponds to previous geospatial data. Moreover, the new status of the artifact corresponds to new geospatial data that updates the previous geospatial data. As an example, the color of the artifact may correspond to a speed at which the artifact is traveling. As another example, the color of the artifact may correspond to time at the geospatial data is collected or measured.

Figure 6:
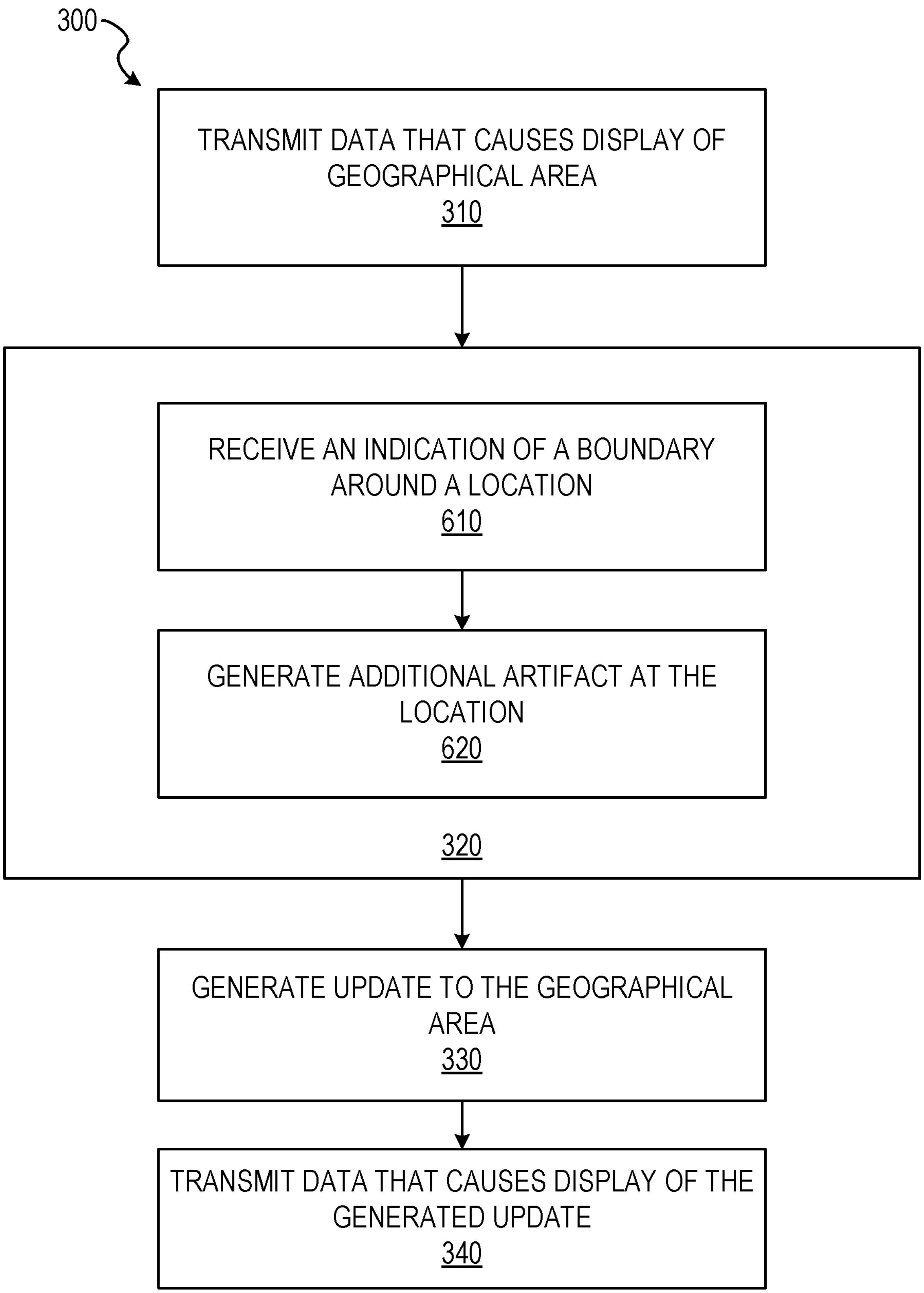

As shown in FIG. 6, the method 300 includes operations 610 and 620. The operations 610 and 620 may be performed prior to the operation 330 (e.g., precursor tasks). Further, the operations 610 and 620 may be performed as part of the operation 320.

At operation 610, the reception module 220 receives an indication of a boundary around a location within the geographical area. In various example embodiments, the indication of the boundary includes a selection of an area that fits the boundary around the location within the geographical area. In further example embodiments, the indication of the boundary includes numerical values that correspond to the boundary around the location within the geographical area. For example, the indication of the boundary may include location coordinates of the boundary around the location. The reception module 220 receives the indication of the boundary from a device that is currently displaying the geographical area.

At operation 620, the generation module 230 generates an additional artifact at the location within the geographical area. In other words, the additional artifact is rendered by the generation module 230 as being around the location within the geographical area. The generating of the additional artifact is based on the received indication of the boundary around the location. Moreover, in some instances, the generation module 230 generates or generates a shape of the additional artifact to match with the indicated boundary around the location received at the operation 610. Effectively, a perimeter of the additional artifact will coincide with the indicated boundary around the location. Alternatively, in some instances, the generation module 230 generates or renders a shape of the additional artifact to be within the indicated boundary around the location received at the operation 610. As a result, the perimeter of the additional artifact will be within the indicated boundary around the location. Further, the generation module 230 modifies the geographical area by generating the additional artifact at the location within the geographical area.

In various example embodiments, the transmitter module 210 transmits the additional artifact generated by the generation module 230 to each of the one more devices. In other words, the transmitter module 210 transmits the modified geographical area to each of the one or more devices. As a result, each of the one more devices viewing the geographical area is also able to view the additional artifact.

Figure 7:
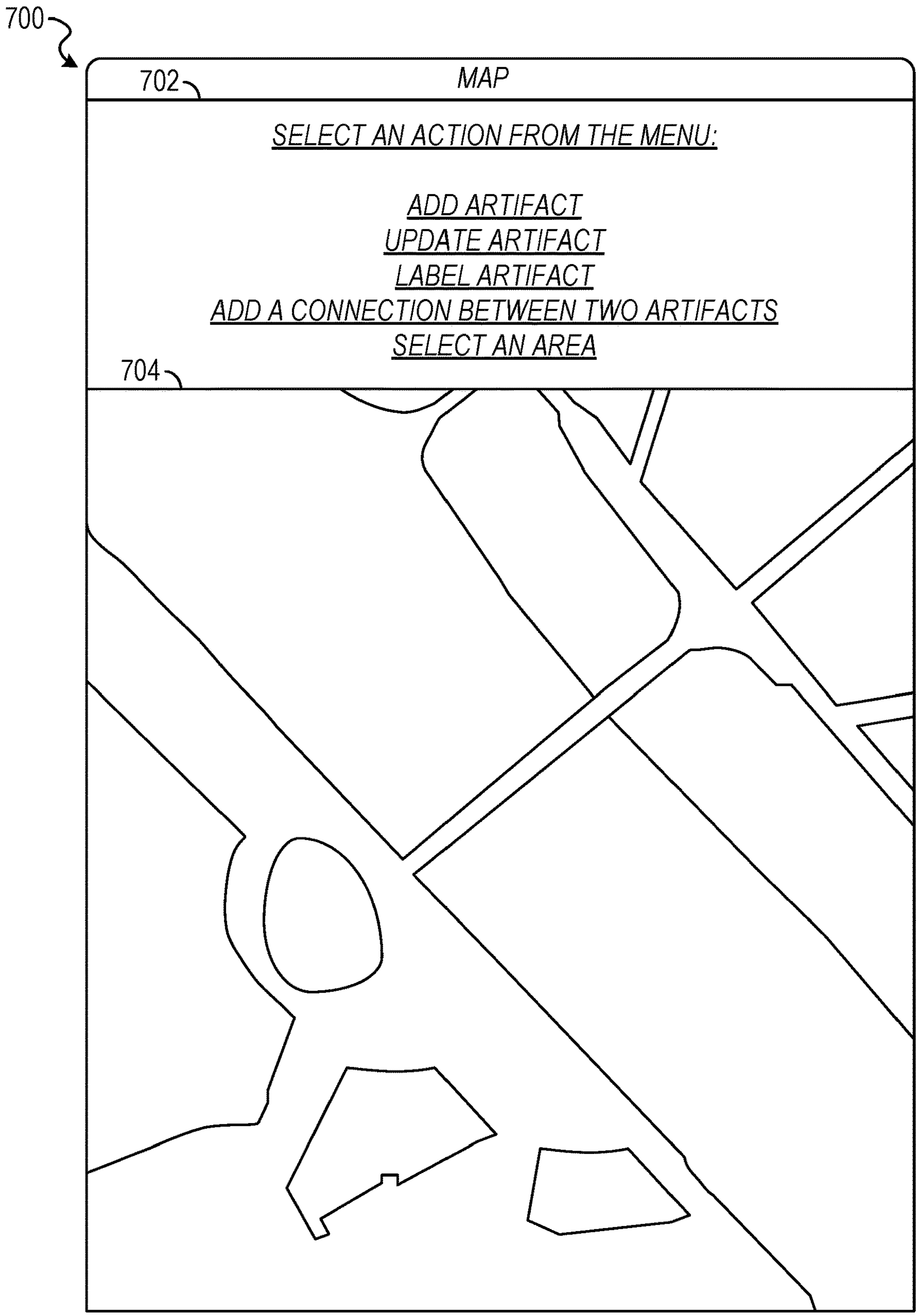
FIG. 7-11 are block diagrams that depict an example user interface of a geographical area, according to some example embodiments.

FIG. 7 is a block diagram that depicts an example user interface 700 of a geographical area, according to some example embodiments. The example user interface 700 is displayed, in some instances, on one or more devices belonging to various users. As shown in FIG. 7, the example user interface includes a panel 702 and a section 704 that displays the geographical area. In various example embodiments, the geographical area corresponds to a city. Moreover, the panel 702 includes one or more options for the user to select. As shown, the options include "add artifact," "update artifact," "label artifact," "add a connection between two artifacts," "indicate a selection," and "draw a polygon." As stated above, each of the one or more options corresponds to an update that is rendered and included in the geographical area displayed in the section 704.

Figure 8:
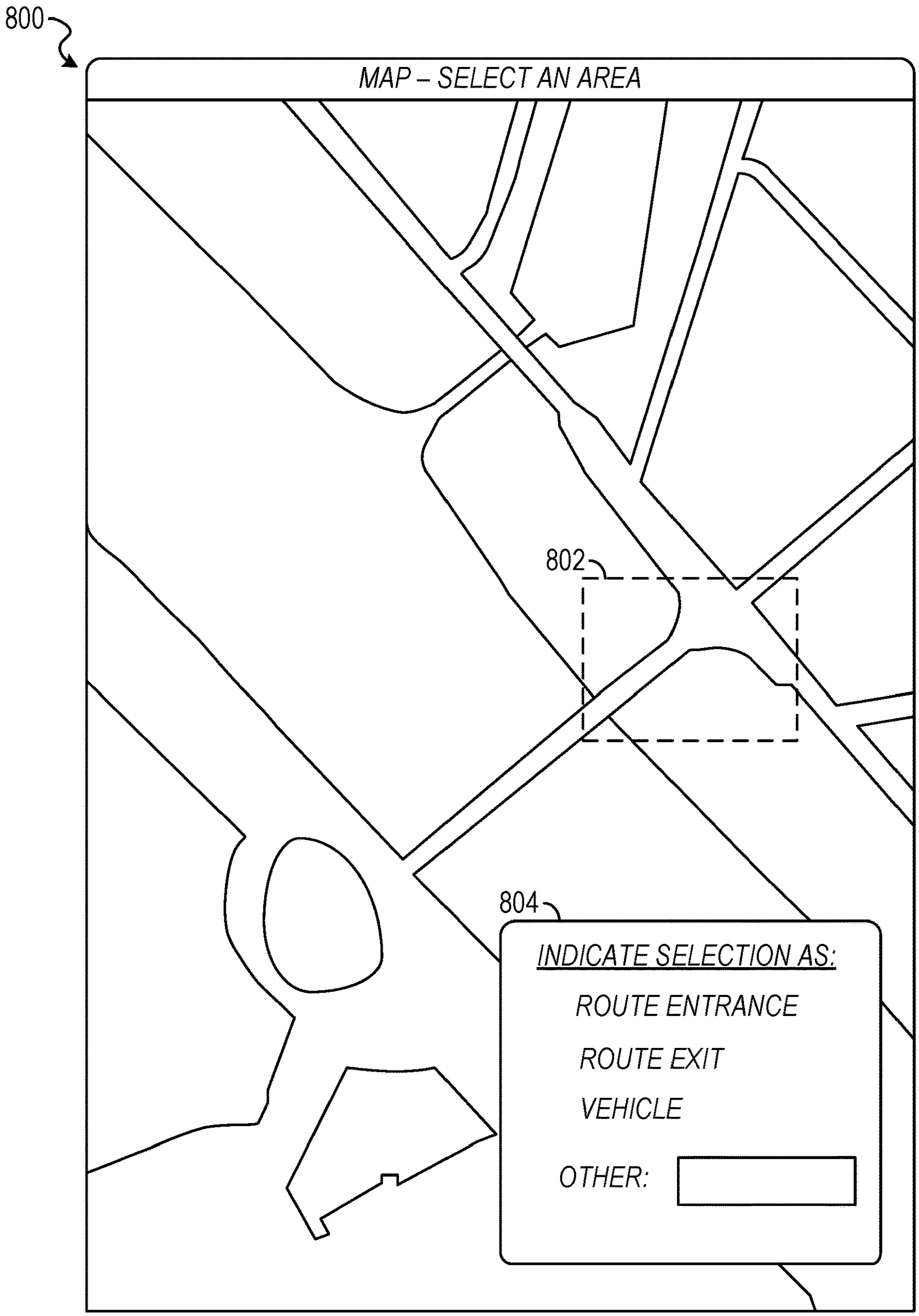

FIG. 8 is a block diagram that depicts an example user interface 800 of a geographical area, according to some example embodiments. The example user interface 800 is displayed, in some instances, on one or more devices belonging to various users. The example user interface 800 includes an area selection 802 and a menu 804. In some instances, the menu 804 corresponds to the area selection 802 in that the menu includes types of geospatial data for the user to associate with the area selection 802. More specifically, the menu includes items that are selectable to correspond to the area selection 802. As shown, the menu 804 lists "route entrance," "route exit," and "vehicle" as the types of geospatial data. The menu 804 also includes an area to indicate a custom type of geospatial data.

Although not shown in FIG. 8, once a type of geospatial data is selected from the menu 804, an artifact is generated to occupy the area selection 802. Moreover, the generated artifact corresponds to the selected type of geospatial data selected from the menu 804. In various example embodiments, once the artifact generated, the geographical area is updated with the generated artifact. Moreover, the updated geographical area is displayed on other user devices that are also viewing the geographical area.

Figure 9:
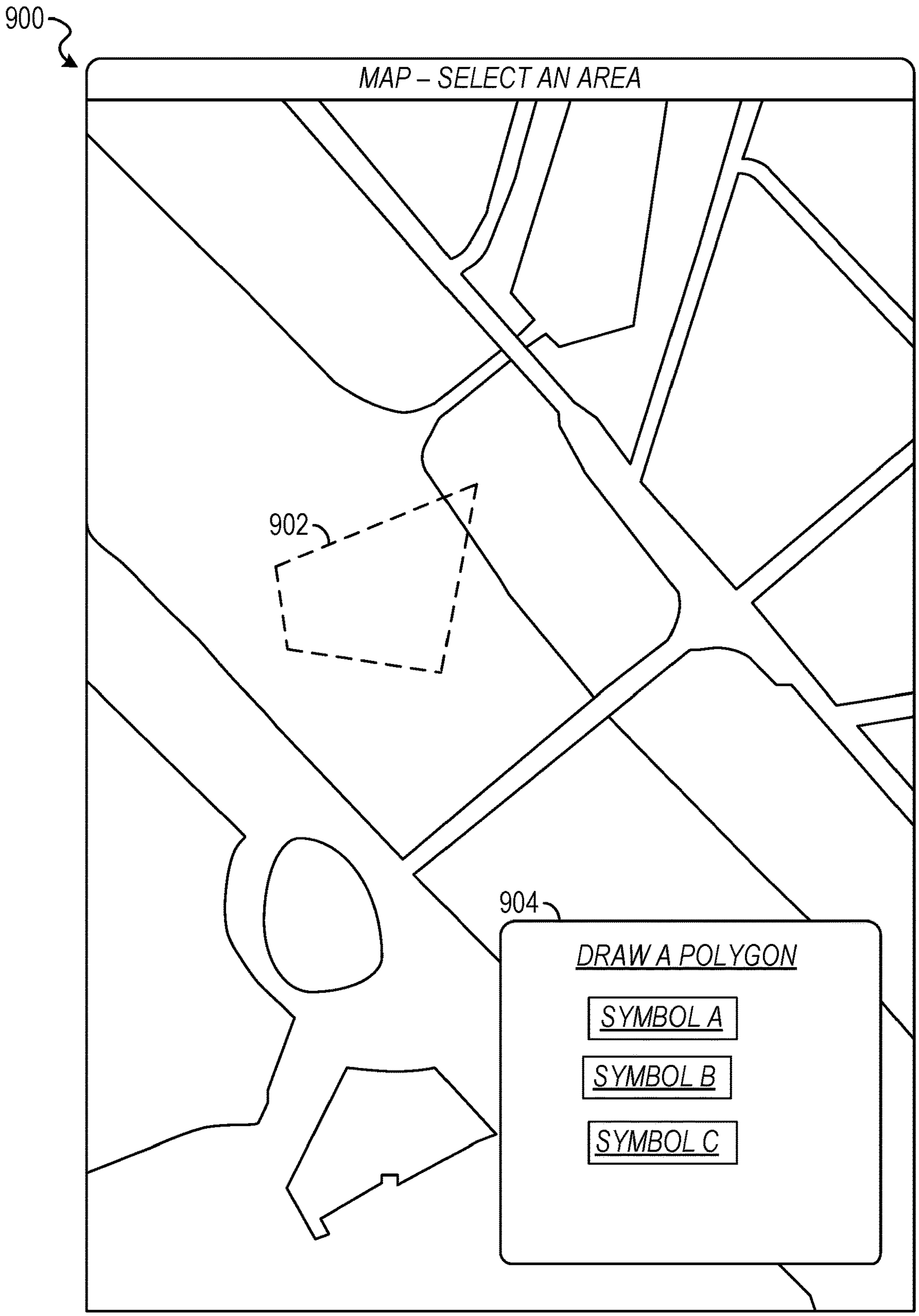

FIG. 9 is a block diagram that depicts an example user interface 900 of a geographical area, according to some example embodiments. The example user interface 900 includes an area selection 902 and a menu 904. As shown in FIG. 9, the area selection 902 is in a shape of a certain polygon. However, the area selection 902 may vary and take on various polygon shapes and forms. The menu 904 displays a list of symbols that a user can select to associate with the area selection 902 from the geographical area. Each of the symbols correspond to a piece of geospatial data. Further, upon selection of a symbol from the menu 904, the symbol is placed over the area selection 902 and takes on the shape of the polygon.

Figure 10:
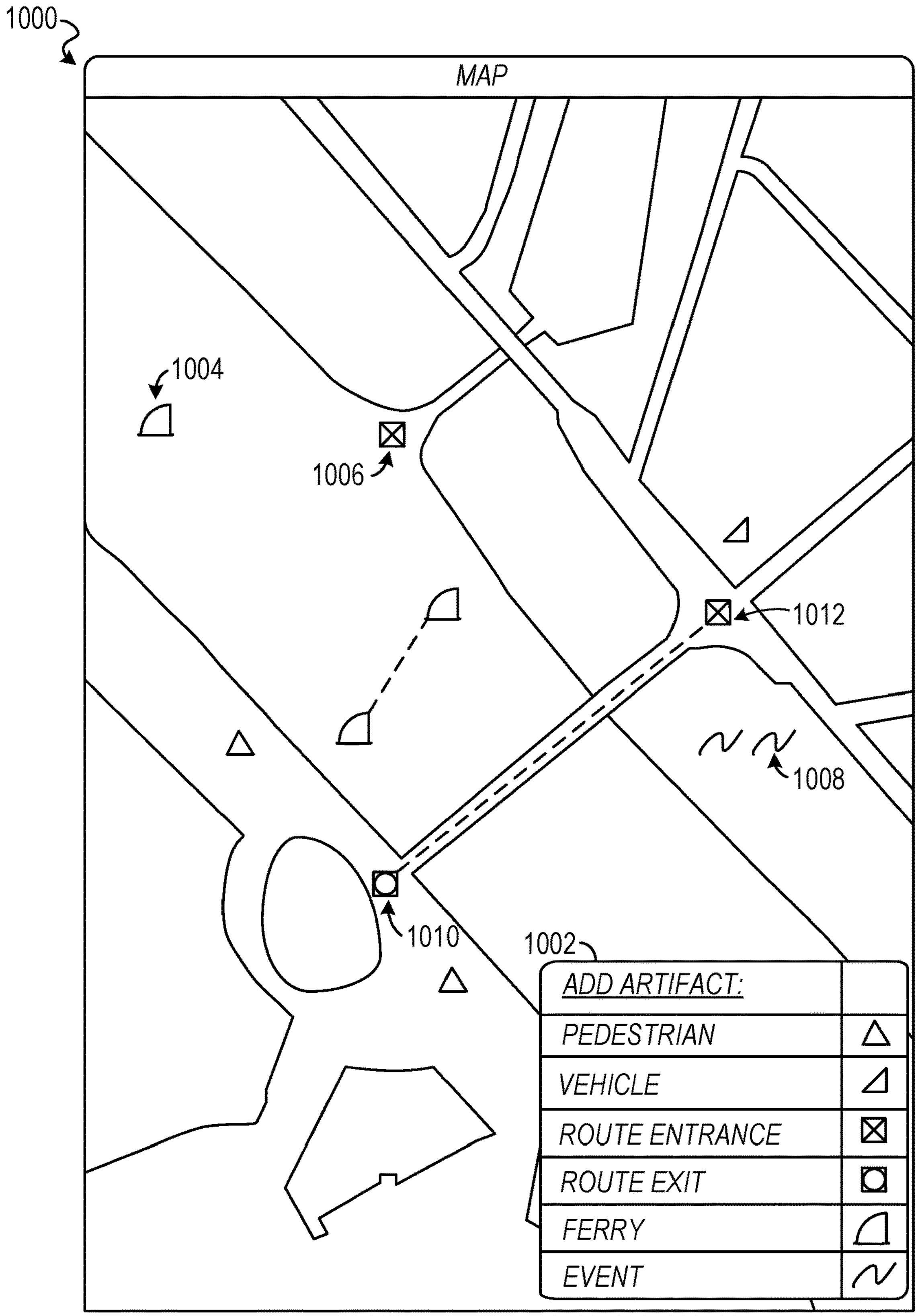

FIG. 10 is a block diagram that depicts an example user interface 1000 of a geographical area, according to some example embodiments. The example user interface 1000 is displayed, in some instances, on one or more devices belonging to various users. As shown in FIG. 10, the example user interface 1000 includes a menu 1002 that is generated. The menu 1002 displays various types of geospatial data and their corresponding symbols. The various types of geospatial data include objects such as "pedestrian," "vehicle," and "ferry." The various types of geospatial data also include paths such as "route entrance" and "route exit." The various types of geospatial data also include events. Moreover, each of the types of geospatial data has a corresponding symbol. In some instances, the symbol is placed in the geographical area as an artifact. As shown in FIG. 10, the example user interface 1000 includes artifacts 1004, 1006, 1008, 1010, and 1012. In various example embodiments, the artifact 1004 corresponds to the "ferry" geospatial data type, as indicated in the menu 1002. In other words, the artifact 1004 indicates the location of a ferry. In various example embodiments, the artifact 1006 corresponds to the "route entrance" geospatial data type. In other words, the location of the artifact 1006 indicates a location of an entrance to a specific trail. In various example embodiments, the artifact 1008 corresponds to the "event" geospatial data type. In other words, the artifact 1008 marks a location of where an event takes place.

In various example embodiments, each of the artifacts from the menu 1002 is selectable. For instance, a user may select an artifact from the menu 1002 and place the selected artifact in the geographical area. In various example embodiments, once the selected artifact is placed in the geographical area, the geographical area is updated with the selected artifact. Moreover, the updated geographical area is displayed on other user devices that are also viewing the geographical area.

As also shown in FIG. 10, a connection is shown between the artifact 1010 and the artifact 1012. As stated before, a connection indicates a relationship between the two artifacts. Accordingly, artifacts 1010 and 1012 are related to one another in that they indicate an entrance and an exit to a particular route in the geographical area. Artifacts can also be related in other ways. For example, two artifacts representing home location may be rendered with the same color if they share an owner. Artifacts may also reference non-geographical data. As an example, there may be a document which describes an event which occurred in a particular location. The artifact which references this document may provide functionality for reading such a document within the map.

Figure 11:
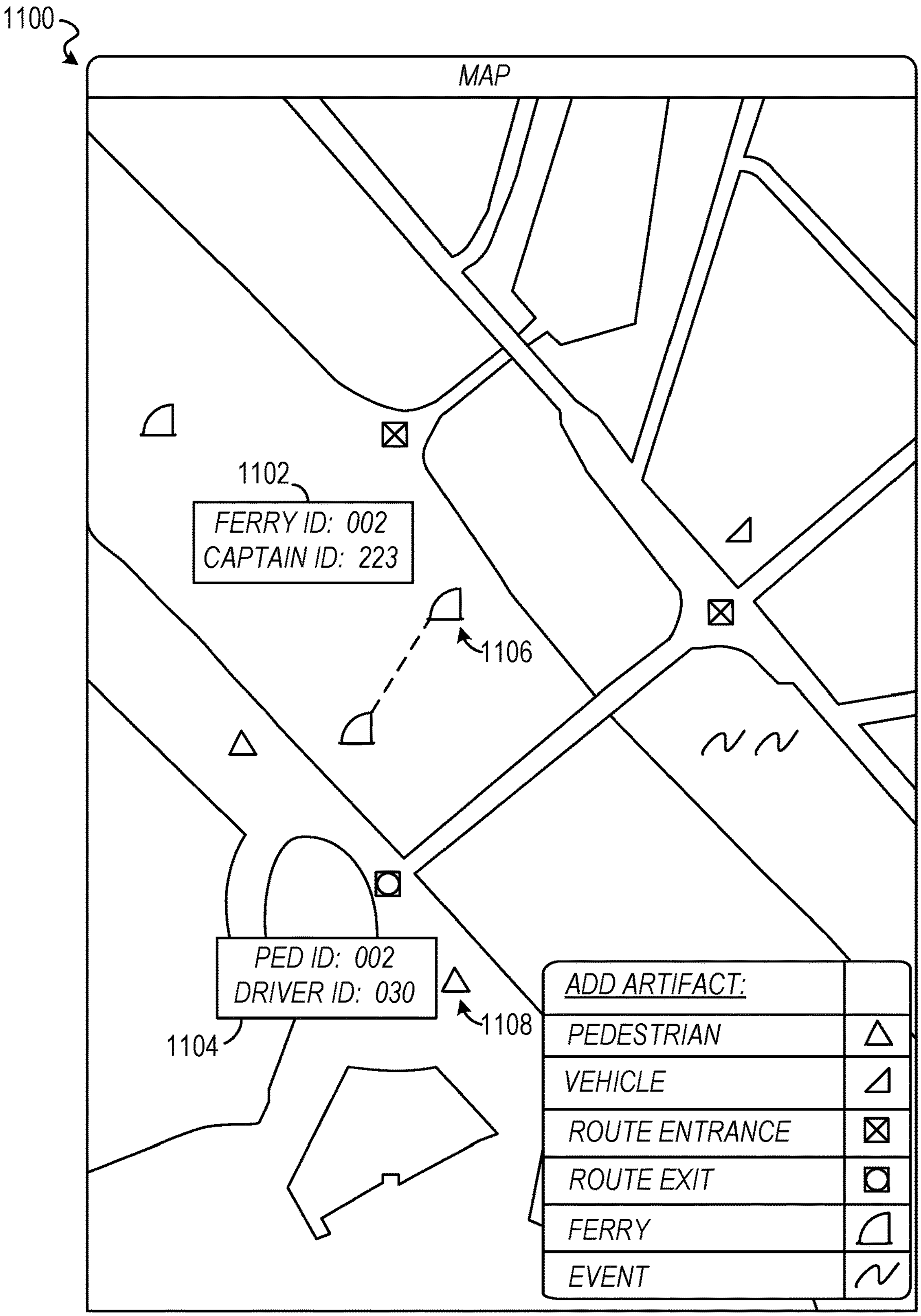

FIG. 11 is a block diagram that depicts an example user interface 1100 of a geographical area, according to some example embodiments. The example user interface 1100 is displayed, in some instances, on a screen of a device operated by a user. In various example embodiments, the user interface 1100 includes labels 1102 and 1104 and artifacts 1106 and 1108. Each of the labels 1102 and 1104 provide additional information regarding the artifacts 1106 and 1108 depicted in the geographical area. For instance, label 1102 indicates identifiers for a ferry corresponding to the artifact 1106. As another example, the label 1104 indicates identifiers for a pedestrian that corresponds to the artifact 1108. Information shown in each of the labels may be provided by a user as an update to the geographical area.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 12:
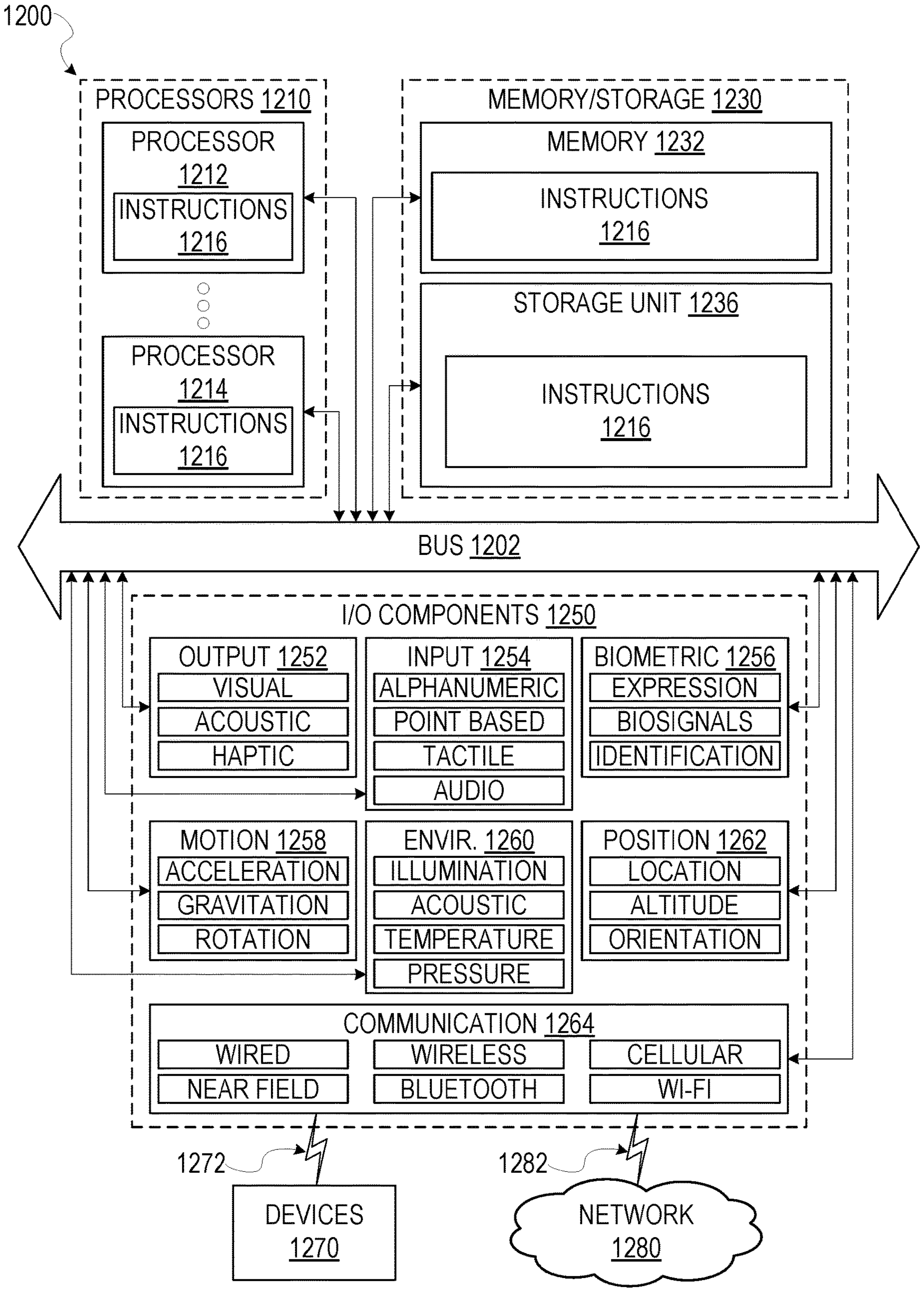
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions may cause the machine to execute the flow diagrams of FIGS. 3-6. Additionally, or alternatively, the instructions may implement modules of FIG. 2, and so forth. The instructions transform the general, non-programmed machine into a particular machine specially configured to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a smart phone, a mobile device, a wearable device (e.g., a smart watch), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

causing display of a graphical user interface (GUI) that includes a menu element to display a set of options, and a representation of a geographical area at a plurality of client devices that include a first client device, the representation of the geographical area comprising a presentation of a set of artifacts at locations within the representation of the geographical area, the set of artifacts including at least a first artifact and a second artifact that represent real-world objects located within the geographical area, the first artifact having a first color;

receiving a user input that comprises a selection of one or more options from among the set of options within the menu element, the selection comprising a request to form a connection between the first artifact and the second artifact from the first client device;

receiving an update associated with the geographical area, the update associated with the geographical area including updated location information and a time at which the updated location information for the first artifact is collected, the update associated with the geographical area further including an occurrence of an event, wherein the updated location information for the first artifact is triggered by the occurrence of the event in the geographical area;

in response to receiving the update, changing the first artifact to a second color different from the first color based on the time at which the updated location information for the first artifact is collected;

adding a third artifact to the set of artifacts, the third artifact representing an indication of the event, the indication of the event including textual information of a description of the event, the event being attended by a plurality of people; and generating a first connection between the third artifact and the first artifact, the first connection indicating a relationship between the third artifact and the first artifact;

generating a second connection between the third artifact and the second artifact, the second connection indicating a relationship between the third artifact and the second artifact;

generating an update to the set of artifacts associated with the representation of the geographical area, the update to the set of artifacts comprising a representation of an indication of the connection between the first artifact and the second artifact, the second color of the first artifact, and the third artifact;

transmitting the update to the set of artifacts to the plurality of client devices including:

transmitting the first connection between the third artifact and the first artifact to the plurality of client devices; and transmitting the second connection between the third artifact and the second artifact to the plurality of client devices;

causing display of the first artifact and the second artifact based on the representation of the indication of the connection between the first artifact and the second artifact within the representation of the geographical area at the first client device based on a set of user attributes associated with the first client device, the first artifact being in the second color; and causing display of the third artifact including the textual information of the description of the event and the number of people attending the event within the representation of the geographical area at the first client device.

2. The method of claim 1, wherein:

the receiving the user input includes receiving an identification of an additional artifact to include in the representation of the geographical area; and the update includes the additional artifact at a first location within the representation of the geographical area.

3. The method of claim 1, wherein the first artifact has a shape, and wherein the changing the first artifact includes a change of the shape of the first artifact.

4. The method of claim 1, further comprising:

receiving a layer that comprises the set of artifacts and indications of locations of the set of artifacts along the representation of the geographical area; and transmitting the layer to the plurality of client devices.

5. The method of claim 1, wherein the changing the first artifact comprises changing the first artifact to the second color based on the updated location information and the time at which the updated location information for the first artifact is collected.

6. The method of claim 1, further comprising:

receiving data associated with an event;

wherein the changing the first artifact comprises changing an artifact attribute of the first artifact based on the data associated with the event.

7. A system comprising:

a memory; and one or more processors to perform operations comprising:

causing display of a graphical user interface (GUI) that includes a menu element to display a set of options, and a representation of a geographical area at a plurality of client devices that include a first client device, the representation of the geographical area comprising a presentation of a set of artifacts at locations within the representation of the geographical area, the set of artifacts including at least a first artifact and a second artifact that represent real-world objects located within the geographical area, the first artifact having a first color;

receiving a user input that comprises a selection of one or more options from among the set of options within the menu element, the selection comprising a request to form a connection between the first artifact and the second artifact from the first client device;

receiving an update associated with the geographical area, the update associated with the geographical area including updated location information and a time at which the updated location information for the first artifact is collected, the update associated with the geographical area further including an occurrence of an event, wherein the updated location information for the first artifact is triggered by the occurrence of the event in the geographical area;

in response to receiving the update, changing the first artifact to a second color different from the first color based on the time at which the updated location information for the first artifact is collected;

adding a third artifact representing an indication of the event, the indication of the event including textual information of a description of the event, the event being attended by a plurality of people;

generating a first connection between the third artifact and the first artifact, the first connection indicating a relationship between the third artifact and the first artifact; and generating a second connection between the third artifact and the second artifact, the second connection indicating a relationship between the third artifact and the second artifact;

generating an update to the set of artifacts associated with the representation of the geographical area, the update to the set of artifacts comprising a representation of an indication of the connection between the first artifact and the second artifact, the second color of the first artifact, and the third artifact;

transmitting the update to the set of artifacts to the plurality of client devices including:

transmitting the first connection between the third artifact and the first artifact to the plurality of client devices; and transmitting the second connection between the third artifact and the second artifact to the plurality of client devices;

causing display of the first artifact and the second artifact based on the representation of the indication of the connection between the first artifact and the second artifact within the representation of the geographical area at the first client device based on a set of user attributes associated with the first client device, the first artifact being in the second color; and causing display of the third artifact including the textual information of the description of the event and the number of people attending the event within the representation of the geographical area at the first client device.

8. The system of claim 7, wherein the one or more processors are further configured to:

receive an identification of an additional artifact to include in the representation of the geographical area; and wherein the update includes the additional artifact at a first location within the representation of the geographical area.

9. The system of claim 7, wherein the first artifact has a shape, and wherein the changing the first artifact includes a change of the shape of the first artifact.

10. The system of claim 7, wherein the one or more processors are further configured to:

receive a layer that comprises a set of artifacts and indications of locations of the set of artifacts along the representation of the geographical area; and transmit the layer to the plurality of client devices.

11. The system of claim 7, wherein the changing the first artifact comprises changing the first artifact to the second color based on the updated location information and the time at which the updated location information for the first artifact is collected.

12. The system of claim 7, wherein the operations further comprise:

receiving data associated with an event;

wherein the changing the first artifact comprises changing an artifact attribute of the first artifact based on the data associated with the event.

13. A non-transitory machine-readable medium storing instructions that, when executed by one or more processors of a machine, cause the machine to perform operations comprising:

causing display of a graphical user interface (GUI) that includes a menu element to display a set of options, and a representation of a geographical area at a plurality of client devices that include a first client device, the representation of the geographical area comprising a presentation of a set of artifacts at locations within the representation of the geographical area, the set of artifacts including at least a first artifact and a second artifact that represent real-world objects located within the geographical area, the first artifact having a first color;

receiving a user input that comprises a selection of one or more options from among the set of options within the menu element, the selection comprising a request to form a connection between the first artifact and the second artifact from the first client device;

receiving an update associated with the geographical area, the update associated with the geographical area including updated location information and a time at which updated location information for the first artifact is collected, the update associated with the geographical area further including an occurrence of an event, wherein the updated location information for the first artifact is triggered by the occurrence of the event in the geographical area;

in response to receiving the update, changing the first artifact to a second color different from the first color based on the time at which the updated location information for the first artifact is collected;

adding a third artifact representing an indication of the event, the indication of the event including textual information of a description of the event, the event being attended by a plurality of people;

generating a first connection between the third artifact and the first artifact, the first connection indicating a relationship between the third artifact and the first artifact; and generating a second connection between the third artifact and the second artifact, the second connection indicating a relationship between the third artifact and the second artifact;

generating an update to the set of artifacts associated with the representation of the geographical area, the update to the set of artifacts comprising a representation of an indication of the connection between the first artifact and the second artifact, the second color of the first artifact, and the third artifact;

transmitting the update to the set of artifacts to the plurality of client devices, based on the storing the update at the memory location associated with the geographical area within the database including:

transmitting the first connection between the third artifact and the first artifact to the plurality of client devices; and transmitting the second connection between the third artifact and the second artifact to the plurality of client devices;

causing display of the first artifact and the second artifact based on the display of the indication of the connection between the first artifact and the second artifact within the representation of the geographical area at the first client device based on a set of user attributes associated with the first client device, the first artifact being in the second color; and causing display of the third artifact including the textual information of the description of the event and the number of people attending the event within the representation of the geographical area at the first client device.

* * * * *